(12) United States Patent
Jin et al.

(10) Patent No.: US 9,189,004 B2
(45) Date of Patent: Nov. 17, 2015

(54) CONTROL CIRCUIT, CONTROL METHOD USED IN PFC CIRCUIT AND POWER SOURCE SYSTEM THEREOF

(71) Applicant: Delta Electronics, Inc., Taoyuan Hsien (TW)

(72) Inventors: Hong-Yuan Jin, Taoyuan Hsien (CN); De-Sheng Guo, Taoyuan Hsien (CN); Hong-Jian Gan, Taoyuan Hsien (CN); Jian-Ping Ying, Taoyuan Hsien (CN)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 213 days.

(21) Appl. No.: 13/759,043

(22) Filed: Feb. 5, 2013

(65) Prior Publication Data
US 2014/0035541 A1 Feb. 6, 2014

(30) Foreign Application Priority Data
Aug. 6, 2012 (CN) .......................... 2012 1 0284439

(51) Int. Cl.
*G05F 1/00* (2006.01)
*G05F 1/70* (2006.01)
*H02M 1/42* (2007.01)

(52) U.S. Cl.
CPC ............... *G05F 1/70* (2013.01); *H02M 1/4225* (2013.01); *Y02B 70/126* (2013.01)

(58) Field of Classification Search
USPC .................. 363/74, 78, 84, 89, 124, 125, 127; 323/265, 266, 282, 283, 235, 241
See application file for complete search history.

(56) References Cited

U.S. PATENT DOCUMENTS

| 6,272,027 | B1 * | 8/2001 | Fraidlin et al. | 363/26 |
| 7,679,213 | B2 * | 3/2010 | Mino | 307/31 |
| 2011/0075462 | A1 * | 3/2011 | Wildash | 363/127 |
| 2012/0014149 | A1 * | 1/2012 | Usami | 363/84 |
| 2012/0051107 | A1 * | 3/2012 | Choi | 363/126 |

FOREIGN PATENT DOCUMENTS

| CN | 101515726 A | 8/2009 |
| CN | 101860194 A | 10/2010 |
| CN | 101951138 A | 1/2011 |
| CN | 102130580 A | 7/2011 |
| CN | 102340252 A | 2/2012 |
| CN | 102377354 A | 3/2012 |
| CN | 102498652 A | 6/2012 |

(Continued)

*Primary Examiner* — Jeffrey Gblende
(74) *Attorney, Agent, or Firm* — CKC & Partners Co., Ltd.

(57) ABSTRACT

A control circuit, control method used in a PFC circuit and the power source system thereof are disclosed herein. The control circuit comprises: a zero current detection circuit having a polarity detection circuit for outputting a first and a second digital signals and a signal conversion circuit for generating an analog signal; a feedback circuit for generating a driving pulse signal; and a pulse distribution circuit for distributing the driving pulse signal to a first and a second switches according to the first and the second digital signal. After a switch cycle, one of the first and the second switch performs an ON operation for the next switch cycle when the current flowing through the inductor decreases to a predetermined threshold value, wherein an ON time of the first switch is equal in each switch cycle, and an ON time of the second switch is equal in each switch cycle.

24 Claims, 12 Drawing Sheets

(56) References Cited

FOREIGN PATENT DOCUMENTS

| EP | 2086095 A1 | 8/2009 |
| TW | 200524260 A | 7/2005 |
| TW | 200818686 A | 4/2008 |
| TW | 201103238 A | 1/2011 |
| WO | 2011052197 A1 | 5/2011 |

* cited by examiner

CONTROL CIRCUIT, CONTROL METHOD USED IN PFC CIRCUIT AND POWER SOURCE SYSTEM THEREOF

RELATED APPLICATIONS

This application claims priority to Chinese Application Serial Number 201210284439.2, filed Aug. 6, 2012, which is herein incorporated by reference.

BACKGROUND

1. Field of Invention

The present invention relates to the technical field of power electronics. More particularly, the present invention relates to a control circuit, control method used in a PFC circuit and the power source system including the control circuit.

2. Description of Related Art

Currently, in order to reduce the serious harmonic pollution to a power grid caused by frequently-used power electronic devices, generally there is a need to introduce a power factor correction (PFC) circuit, so as to make the input current harmonic meet the requirements of a predetermined harmonic through the PFC circuit. Additionally, the development trend of the PFC circuit is towards the direction of high efficiency and high power density, just as most of the power source products.

Taking a bridgeless PFC circuit topology as an example, the circuit has many advantages, such as low conduction losses, low common-mode interfere and high utilization ratio of components. For example, the bridgeless PFC circuit includes a first bridge arm and a second bridge arm connected with each other in parallel. The first bridge arm is formed by a first MOSFET and a second MOSFET. The second bridge arm is formed by a first diode D1 and a second diode D2.

When the second MOSFET is off and the first MOSFET is on in the first bridge arm, the inductor releases energy through the first MOSFET and a fourth MOSFET. Accordingly, the inductor current decreases. Afterwards, the inductor current decreases to zero at a certain moment and after the moment the direction of the current is reversed. When the first MOSFET is off, a voltage ($V_{DS}$) across two ends of the drain electrode and the source electrode of the second MOSFET starts to decrease. If the second MOSFET is controlled to be turned on when the voltage decreases to zero, it is realized to turn on the second MOSFET under a zero voltage, so as to reduce the switch loss. However, it is a subject for related technicians to solve which control mechanism is used to realize the above-mentioned turn-on under the zero voltage so as to reduce the switch loss of the circuit. Additionally, it is a task for designers to solve how the zero-crossing point of the inductor current is automatically detected in a simple and effective way.

SUMMARY

For the above-mentioned defects of a bridgeless PFC circuit of the conventional art in terms of reducing the switch loss, the present invention provides a control circuit, control method used in a PFC circuit and the power source system including the control circuit.

According to a technical aspect of the present invention, a control circuit used in a PFC circuit is provided. The PFC circuit includes an inductor, a first bridge arm and a second bridge arm connected to the first bridge arm in parallel. The first bridge arm has a first switch and a second switch connected with each other in series. The common node of the first switch and the second switch is coupled to an input voltage through the inductor.

The control circuit includes a zero current detection circuit, a feedback circuit and a pulse distribution circuit. The zero current detection circuit includes a polarity detection circuit and a signal conversion circuit. The polarity detection circuit is used to receive an input voltage and output a first digital signal and a second digital signal indicating a polarity of the input voltage. A potential of the first digital signal is opposite to that of the second digital signal. The signal conversion circuit receives at least one inductive signal reflecting an inductive voltage of the inductor, the first digital signal and the second digital signal and generates an analog signal. The feedback circuit is used to receive the analog signal and a predetermined pulse signal and generate a driving pulse signal. The pulse distribution circuit is used to distribute the driving pulse signal to the first switch and the second switch of the first bridge arm according to the first digital signal and the second digital signal so that one of the first switch and the second switch performs an ON operation. After a switch cycle, one of the first switch and the second switch performs the ON operation for the next switch cycle when the current flowing through the inductor decreases to a predetermined threshold value, wherein an ON time of the first switch is equal in each switch cycle, and an ON time of the second switch is equal in each switch cycle.

According to another technical aspect of the present invention, a power source system is provided. The power source system includes a PFC circuit and a control circuit. The PFC circuit includes: a first bridge arm and a second bridge arm. The first bridge arm includes a first switch and a second switch connected with each other in series. The common node of the first switch and the second switch is coupled to one end of an input voltage through an inductor. The second bridge arm includes a third switch and a fourth switch connected with each other in series. The common node of the third switch and the fourth switch is coupled to the other end of the input voltage. The control circuit includes: a zero current detection circuit having a polarity detection circuit and a signal conversion circuit, a feedback circuit and a pulse distribution circuit. The polarity detection circuit is used to receive the input voltage and output a first digital signal and a second digital signal indicating the polarity of the input voltage. A potential of the first digital signal is opposite to that of the second digital signal. The signal conversion circuit receives at least one inductive signal reflecting an inductive voltage of the inductor, the first digital signal and the second digital signal and generates an analog signal. The feedback circuit is used to receive the analog signal and a predetermined pulse signal and generate a driving pulse signal. The pulse distribution circuit is used to distribute the driving pulse signal to the first switch and the second switch of the first bridge arm according to the first digital signal and the second digital signal, so that the first switch or the second switch performs an ON operation. After a switch cycle, one of the first switch and the second switch performs an ON operation for the next switch cycle when the current flowing through the inductor decreases to a predetermined threshold value, wherein an ON time of the first switch is equal in each switch cycle, and an ON time of the second switch is equal in each switch cycle.

According to a further technical aspect of the present invention, a control method used for a PFC circuit is provided. The PFC circuit includes an inductor, a first bridge arm and a second bridge arm connected to the first bridge arm in parallel. The first bridge arm has a first switch and a second switch connected with each other in series. The common node of the first switch and the second switch is coupled to an input voltage through the inductor. The control method includes the following steps: (a) detecting a polarity of the input voltage so as to output a first digital signal and a second digital signal indicating the polarity of the input voltage; (b) generating an analog signal through the signal conversion processing according to at least one inductive signal reflecting an inductive voltage of the inductor, the first digital signal and the second digital signal; (c) providing a predetermined pulse signal and generating a driving pulse signal according to the analog signal and the predetermined pulse signal; and (d) distributing the driving pulse signal to the first switch and the second switch according to the first digital signal and the second digital signal so that one of the first switch and the second switch performs an ON operation.

According to yet a further technical aspect of the present invention, a control circuit used for the PFC circuit is provided. The PFC circuit includes an inductor, a first bridge arm and a second bridge arm connected to the first bridge arm in parallel. The first bridge arm has a first switch and a second switch connected with each other in series. The common node of the first switch and the second switch is coupled to an input voltage through the inductor. The control circuit includes a zero current detection circuit, a feedback circuit and a pulse distribution circuit. The zero current detection circuit includes an edge detection circuit which is used to receive at least one inductive signal reflecting an inductive voltage of the inductor and detect and output a rising edge or a falling edge in the inductive signal; and an enabling circuit which is used to filter the detected rising edge or the detected falling edge and output a zero current detection signal. The feedback circuit is used to receive the zero current detection signal and a predetermined pulse signal and generate a driving pulse signal. The pulse distribution circuit includes a polarity detection circuit. The polarity detection circuit receives the input voltage and outputs a first digital signal and a second digital signal indicating a polarity of the input voltage. A potential of the first digital signal is opposite to that of the second digital signal. The pulse distribution circuit distributes the received driving pulse signal to the first switch and the second switch of the first bridge arm according to the first digital signal and the second digital signal so that one of the first switch and the second switch performs an ON operation. After a switch cycle, one of the first switch and the second switch performs the ON operation for the next switch cycle when the current flowing through the inductor decreases to a predetermined threshold value, and an ON time of the first switch is equal in each switch cycle, and an ON time of the second switch is equal in each switch cycle.

According to still yet a further technical aspect of the present invention, a power source system is provided, including a PFC circuit and a control circuit. The PFC circuit includes: a first bridge arm and a second bridge arm. The first bridge arm includes a first switch and a second switch connected with each other in series. A common node of the first switch and the second switch is coupled to one end of an input voltage through an inductor. The second bridge arm includes a third switch and a fourth switch connected with each other in series. A common node of the third switch and the fourth switch is coupled to the other end of the input voltage. The control circuit includes: a zero current detection circuit, a feedback circuit and a pulse distribution circuit. The zero current detection circuit has an edge detection circuit and an enabling circuit. The edge detection circuit is used to receive at least one inductive signal reflecting the inductive voltage of the inductor, and detect and output a rising edge or a falling edge in the inductive signal. The enabling circuit is used to filter the detected rising edge or the detected falling edge so as to output a zero current detection signal. The feedback circuit is used to receive the zero current detection signal and a predetermined pulse signal and generate a driving pulse signal. The pulse distribution circuit includes a polarity detection circuit. The polarity detection circuit receives the input voltage and outputs a first digital signal and a second digital signal indicating a polarity of the input voltage. A potential of the first digital signal is opposite to that of the second digital signal. The pulse distribution circuit distributes the received driving pulse signal to the first switch and the second switch of the first bridge arm according to the first digital signal and the second digital signal so that one of the first switch and the second switch performs an ON operation. After a switch cycle, one of the first switch and the second switch performs the ON operation for the next switch cycle when the current flowing through the inductor decreases to a predetermined threshold value, and an ON time of the first switch is equal in each switch cycle, and an ON time of the second switch is equal in each switch cycle.

According to a technical aspect of the present invention, a control method used for a PFC circuit is provided. The PFC circuit includes an inductor, a first bridge arm and a second bridge arm connected to the first bridge arm in parallel. The first bridge arm has a first switch and a second switch connected with each other in series. A common node of the first switch and the second switch is coupled to an input voltage through the inductor. The control method includes the following steps: (a) receiving at least one inductive signal reflecting an inductive voltage of the inductor and generating a zero current detection signal through an edge detection and filtering processing; (b) providing a predetermined pulse signal and generating a driving pulse signal according to the zero current detection signal and the predetermined pulse signal; (c) detecting a polarity of the input voltage to output a first digital signal and a second digital signal indicating the polarity of the input voltage; and (d) distributing the driving pulse signal to the first switch and the second switch according to the first digital signal and the second digital signal so that one of the first switch and the second switch performs an ON operation.

The current zero-crossing point detection is realized by using the control circuit, control method and power source system used in the bridgeless PFC circuit of the present invention and through the combination of the polarity detection of the input voltage and the voltage detection of the auxiliary winding. Accordingly, the bridgeless PFC circuit is enabled to work in the critical conduction control mode, so that it is realized to turn on the switch in the first bridge arm under a zero voltage, thereby reducing the switch loss. Furthermore, the combination of the driving pulse signal and the edge detection circuit is used to realize the zero-crossing detection of the inductor current, without detecting the phase/polarity of the input voltage. In this way, the bridgeless PFC circuit is also enabled to work in the critical conduction control mode. The circuit design is simple and the zero-crossing detection of the inductor current is more reliable.

BRIEF DESCRIPTION OF THE DRAWINGS

In order to make the foregoing as well as other aspects, features, advantages, and embodiments of the present invention more apparent, the accompanying drawings are described as follows.

DETAILED DESCRIPTION

Figure 1A:
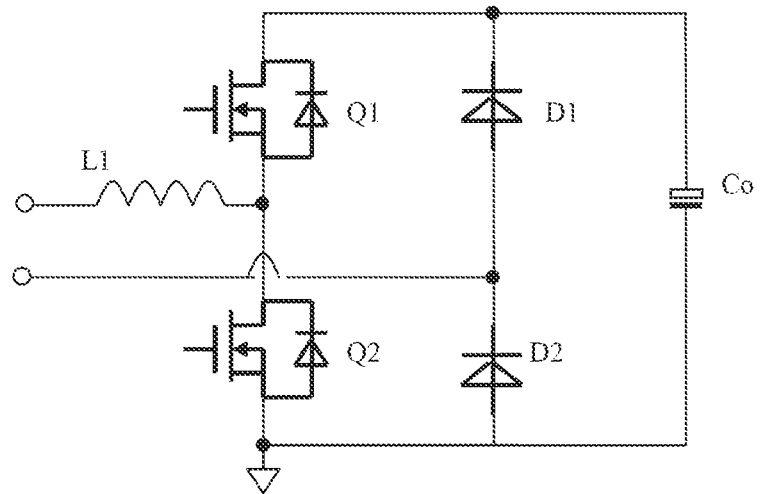
FIG. 1A illustrates a circuit structure diagram of a bridgeless PFC circuit.

In order to make the description of the present invention more detailed and more comprehensive, various embodiments of the present invention are described below with reference to the accompanying drawings. Wherever possible, the same reference numbers are used in the drawings and the description to refer to the same or like parts. On the other hand, well-known elements and steps are not described in embodiments so as to avoid the unnecessary limitation to the present invention.

In the embodiments and claims, the description involving "electrical connection" may generally mean that an element is indirectly connected to another element through other electrical elements or an element is directly connected to another element without through other electrical elements.

In the embodiments and claims, the articles "a", "an" and "the" refer to one or more, unless expressly specified otherwise.

As used herein, the terms "about", "approximately", "subsequently" or "near" are used to modify any micro-variable quantity, but these micro-variations do not change the nature of the quantity. In the embodiments the error of the quantity modified by terms "about", "approximately", "subsequently" or "near" is in a range of 20%, preferably in a range of 10%, and more preferably in a range of 5%, unless expressly specified otherwise.

FIG. 1A illustrates a circuit structure diagram of a bridgeless PFC circuit. Referring to FIG. 1A, the bridgeless PFC (Power Factor Correction) circuit includes a first bridge arm and a second bridge arm. The first bridge arm includes a first switch Q1 and a second switch Q2 connected with each other in series (e.g., MOSFET). A common node of the first switch Q1 and the second switch Q2 is coupled to one end of an input voltage through an inductor L1. The second bridge arm includes a third switch and a fourth switch connected with each other in series. A common node of the third switch and the fourth switch is coupled to the other end of the input voltage.

In an embodiment, each of the third switch and the fourth switch is a slow-recovery diode, as shown by D1 and D2 in FIG. 1A.

Figure 1B:
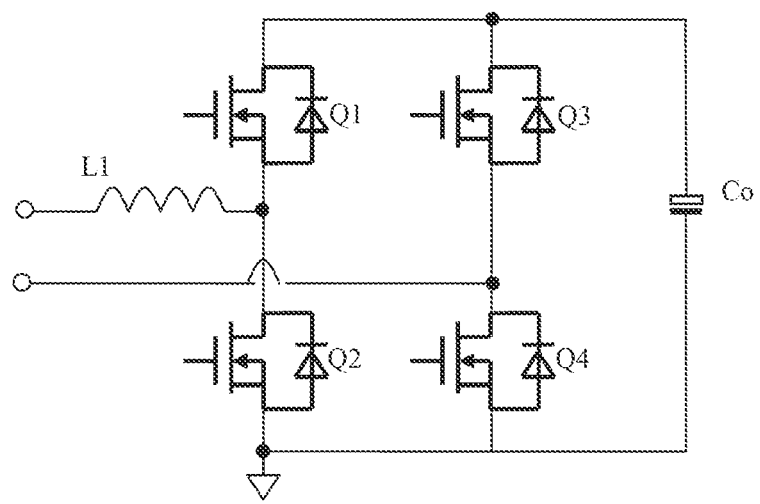
FIG. 1B illustrates a circuit structure diagram of a bridgeless PFC circuit according to another one embodiment of the present disclosure.

FIG. 1B illustrates a circuit structure diagram of a bridgeless PFC circuit accroding to another one embodiment of the present disclosure.

In some other embodiments, as shown in FIG. 1B, each of the first switch Q1 and the second switch Q2 is a fast-recovery MOSFET. Each of the third switch and the fourth switch is a slow-recovery MOSFET, as shown by Q3 and Q4 in FIG. 1B. For example, the fast-recovery MOSFET is a wide band gap semiconductor component, such as silicon carbide (SiC) or gallium nitride (GaN).

Figure 2:
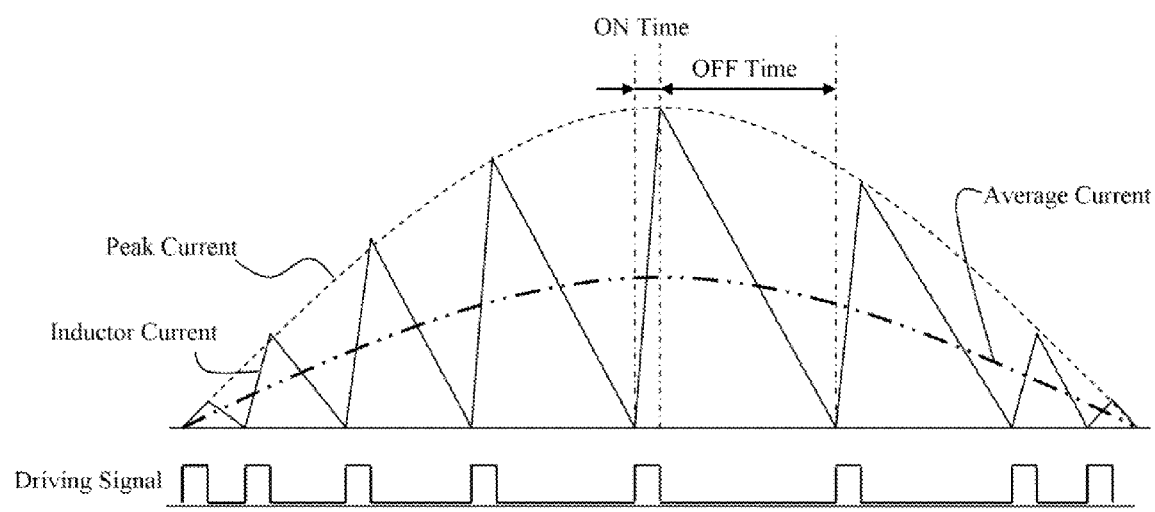
FIG. 2 illustrates a schematic view of an inductor current waveform, a peak inductor current waveform, an average inductor current waveform and a driving signal waveform of the switch when the bridgeless PFC circuit in FIG. 1A works in the critical conduction mode (CRM)

FIG. 2 illustrates a schematic view of an inductor current waveform, a peak inductor current waveform, an average inductor current waveform and a driving signal waveform of the switch when the bridgeless PFC circuit in FIG. 1A works in the critical conduction mode (CRM).

Referring to FIG. 2, when the bridgeless PFC circuit works in the CR the end of each switch cycle (or at the start of the next switch cycle), the inductor current just decreases to zero. It can be known from the figure that when one of the switches Q1 and Q2 in the first bridge arm receives a driving signal, from the ON time of the switch, the inductor current gradually increases and reaches the peak current (the period corresponds to the ON time). Thereafter, the switch is off and the inductor current gradually decreases from the peak current to zero (the period corresponds to the OFF time). Since each switch cycle includes the rising period and the falling period of the inductor current, the common point of the rising period and the falling period is connected (i.e. a point corresponding to the peak current) to form the peak current curve in FIG. 2.

Additionally, according to the inductor current curve and the peak current curve, the corresponding average current curve also can be obtained.

Figure 3:
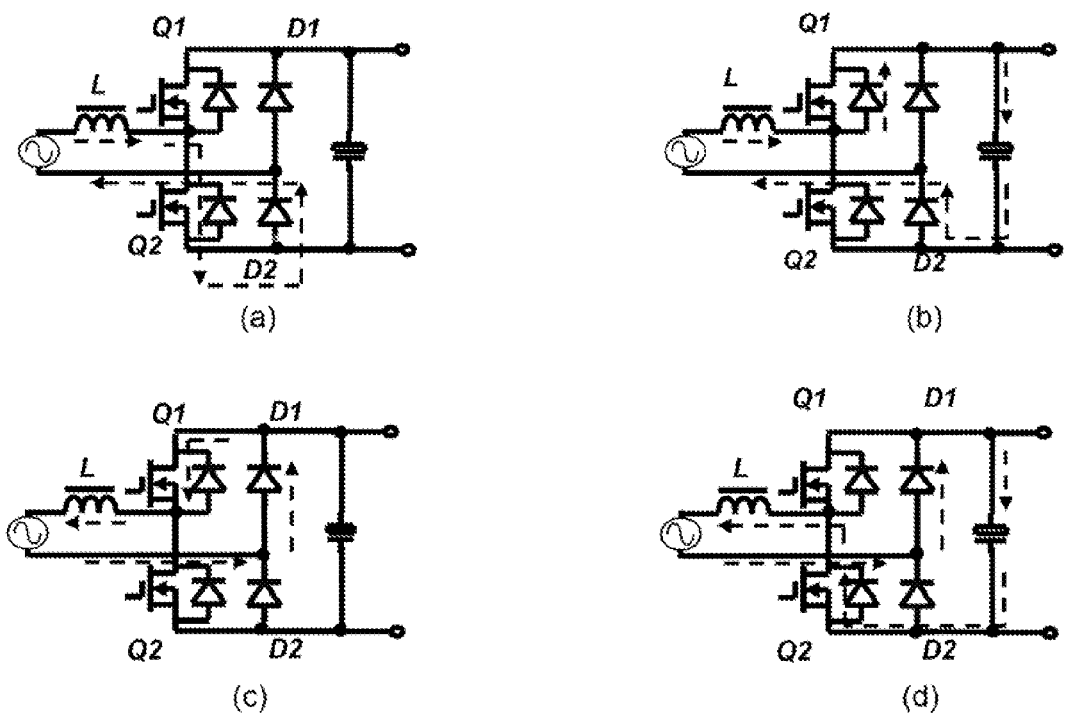
FIG. 3(a) illustrates a schematic view of a current path when the second switch is on while the AC input voltage in FIG. 1 is a positive voltage.
FIG. 3(b) illustrates a schematic view of a current path when the second switch is off and the current is continued through the body diode of the first switch while the AC input voltage in FIG. 1A is a positive voltage.
FIG. 3(c) illustrates a schematic view of a current path when the first switch is on while the AC input voltage in FIG. 1A is a negative voltage.
FIG. 3(d) illustrates a schematic view of a current path when the first switch is off and the current is continued through the body diode of the second switch while the AC input voltage in FIG. 1A is a negative voltage.

FIG. 3(a) illustrates a schematic view of a current path when the second switch is on while the AC input voltage in FIG. 1A is a positive voltage. FIG. 3(b) illustrates a schematic view of a current path when the second switch is off and the current is continued through the body diode of the first switch while the AC input voltage in FIG. 1A is a positive voltage.

Referring to FIGS. 3(a) and 3(b), in view of the condition that the input voltage is a positive voltage, if the switch Q2 is on and the switch Q1 is off, the current path is formed by the inductor L, the switch Q2 and the diode D2. If the switch Q1 and the switch Q2 are both off, the current path is formed by the inductor L, the body diode of the switch Q1, the capacitor and the diode D2.

FIG. 3(c) illustrates a schematic view of a current path when the first switch is on while the AC input voltage in FIG. 1A is a negative voltage. FIG. 3(d) illustrates a schematic view of a current path when the first switch is off and the current is continued through the body diode of the second switch while the AC input voltage in FIG. 1A is a negative voltage.

Referring to FIGS. 3(c) and 3(d), in view of the condition that the input voltage is a negative voltage, if the switch Q1 is on and the switch Q2 is off, the current path is formed by the inductor L, the switch Q1 and the diode D1 If the switch Q1 and the switch Q2 are both off, the current path is formed by the inductor L, the body diode of the switch Q2, the capacitor and the diode D1.

Figure 4:
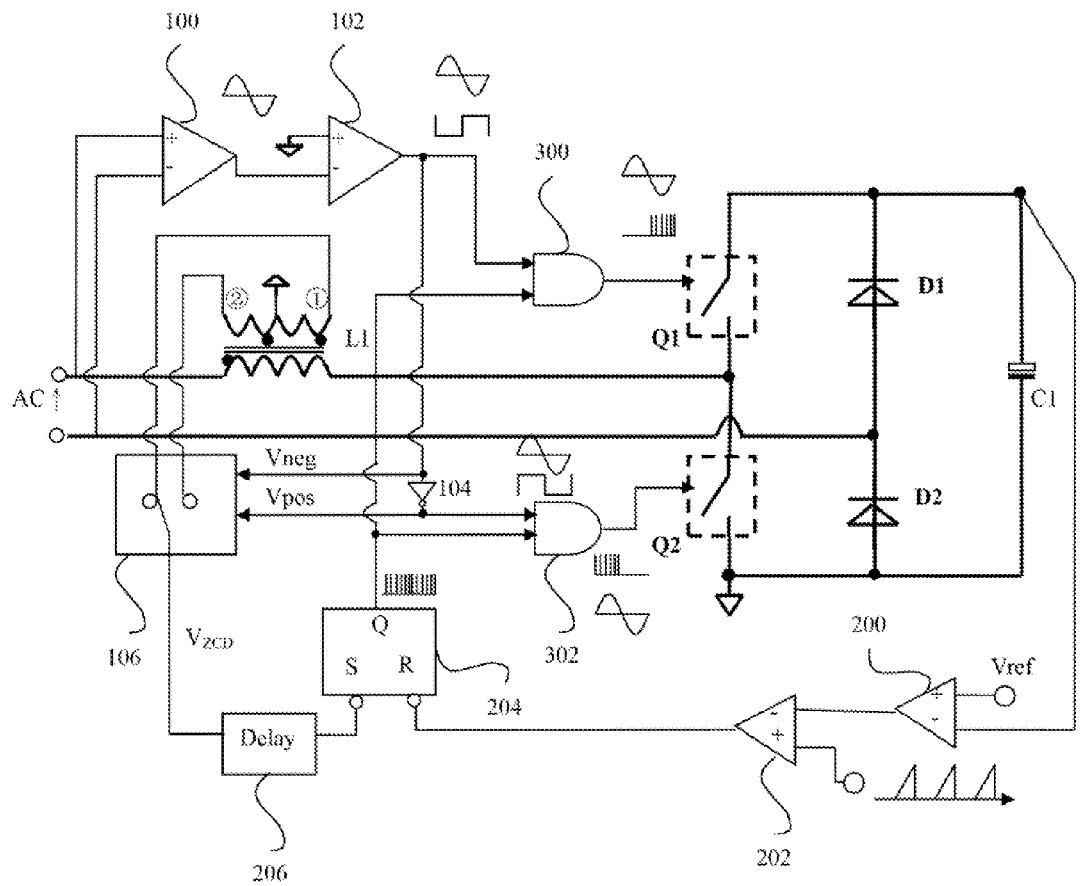
FIG. 4 illustrates a structure diagram of a control circuit for a PFC circuit according to an embodiment of the present invention.

FIG. 4 illustrates a structure diagram of a control circuit for a PFC circuit according to an embodiment of the present invention.

Referring to FIG. 4, the control circuit for the bridgeless PFC circuit includes a zero current detection circuit, a feedback circuit and a pulse distribution circuit.

The zero current detection circuit includes a polarity detection circuit and a signal conversion circuit. The polarity detection circuit receives the input voltage of the AC power source and outputs a first digital signal and a second digital signal indicating the polarity of the input voltage. Herein, the potential polarity of the first digital signal is always opposite to that of the second digital signal. When the first digital signal is at a high potential, the second digital signal is at a low potential. When the first digital signal is at a low potential, the second digital signal is at a high potential. The signal conversion circuit receives at least one inductive signal reflecting the inductive voltage of the inductor L1, the above-mentioned first digital signal and second digital signal and generates an analog signal.

It should be understood that the control circuit can output an inductive signal reflecting the inductive voltage of the inductor through two auxiliary windings or through a single auxiliary winding. For example, one of two auxiliary windings is used to output the inductive signal when the polarity of the voltage is positive. The other auxiliary winding is used to output the inductive signal when the polarity of the voltage is negative. Also for example, one end of a single auxiliary winding is used to output the inductive signal when the polarity of the voltage is positive. The other end of the single auxiliary winding is used to output the inductive signal when the polarity of the voltage is negative.

The feedback circuit is used to receive the analog signal from the signal conversion circuit and a predetermined pulse signal and generate a driving pulse signal according to the analog signal and the predetermined pulse signal. The pulse distribution circuit is electrically coupled to the polarity detection circuit and the feedback circuit. The pulse distribution circuit is used to distribute the driving pulse signal outputted by the feedback circuit to the first switch Q1 and the second switch Q2 of the first bridge arm according to the first digital signal and the second digital signal from the polarity detection circuit. Accordingly, one of the first switch Q1 and the second switch Q2 performs an ON operation. After a switch cycle, one of the first switch Q1 and the second switch Q2 performs the ON operation for the next switch cycle when the current flowing through the inductor L1 decreases to a predetermined threshold value, and an ON time of the first switch Q1 is equal in each switch cycle and an ON time of the second switch Q2 is equal in each switch cycle.

In an embodiment, the polarity detection circuit includes a first operational amplifier 100, a first comparator 102 and a first inverter 104.

The first operational amplifier 100 has a first input end (such as a positive-phase input end), a second input end (such as a negative-phase input end) and an output end. The first input end and the second input end of the first operational amplifier 100 are connected to two ends of the input voltage respectively. The output end of the first operational amplifier 100 is used to output a voltage signal reflecting the polarity of the input voltage. The first comparator 102 has a first input end, a second input end and an output end. The first input end of the first comparator 102 is coupled to the output end of the first operational amplifier 100. The second input end of the first comparator 102 is coupled to a first reference voltage (such as a ground voltage). The output end of the first comparator 102 is used to output the first digital signal. The first inverter 104 is used to convert the first digital signal into a second digital signal. Therefore, the polarity detection circuit outputs the first digital signal and the second digital signal. The potential polarity of the first digital signal is always opposite to that of the second digital signal.

In an embodiment, the feedback circuit includes a second operational amplifier 200, a second comparator 202 and a RS trigger 204.

The second operational amplifier 200 has a first input end (such as a negative-phase input end), a second input end (such as a positive-phase input end) and an output end. The first input end of the second operational amplifier 200 is used to receive the output voltage of the power factor control circuit (i.e., a load voltage across two ends of a capacitor). The second input end of the second operational amplifier 200 is coupled to a second reference voltage (such as $V_{ref}$). The output end of the second operational amplifier 200 outputs a difference amplification signal. The second comparator 202 has a first input end, a second input end and an output end. The first input end of the second comparator 202 is coupled to the output end of the second operational amplifier 200. The second input end of the second comparator 202 is used to receive a saw-tooth wave voltage signal. The output end of the second comparator 202 outputs the predetermined pulse signal. The RS trigger 204 has a preset end S, a reset end R and an output end Q. The preset end S of the RS trigger 204 is used to receive the analog signal $V_{ZCD}$ from the signal conversion circuit. The reset end R of the RS trigger 204 is used to receive the predetermined pulse signal from the second comparator 202. The output end of the RS trigger 204 is used to output the driving pulse signal.

Additionally, the feedback circuit further includes a delay circuit 206 arranged between the signal conversion circuit and the RS trigger 204. The delay circuit 206 is used to delay the analog signal $V_{ZCD}$ and send the delayed analog signal to the preset end S of the RS trigger 204. Furthermore, the feedback circuit further includes a comparing unit (not shown) arranged between the delay circuit 206 and the RS trigger 204. The comparing unit is used to convert the delayed analog signal into a corresponding digital delay signal and send it to the preset end S of the RS trigger 204.

In an embodiment, the pulse distribution circuit includes a first AND gate circuit 300 and a second AND gate circuit 302.

The first AND gate circuit 300 has a first input end, a second input end and an output end. The first input end of the first AND gate circuit 300 is used to receive the first digital signal from the polarity detection circuit. The second input end of the first AND gate circuit 300 is used to receive the driving pulse signal from the feedback circuit. The output end of the first AND gate circuit 300 outputs a first control signal to the first switch Q1 of the first bridge arm.

The second AND gate circuit 302 has a first input end, a second input end and an output end. The first input end of the second AND gate circuit 302 is used to receive the second digital signal from the polarity detection circuit. The second input end of the second AND gate circuit 302 is used to receive the driving pulse signal from the feedback circuit. The output end of the second AND gate circuit 302 outputs a second control signal to the second switch Q2 of the first bridge arm. Since the driving pulse signal received by the second AND gate circuit 302 is the same as the driving pulse signal received by the first AND gate circuit 300 and the potential polarity of the second digital signal is always opposite to that of the first digital signal, only one of the first switch Q1 and the second switch Q2 in the first bridge arm is on and the other switch is off at any moment.

For example, when the polarity of the input voltage is positive, the first digital signal is at a low potential and the second digital signal is at a high potential. When the polarity of the input voltage is negative, the first digital signal is at a high potential and the second digital signal is at a low potential.

Those of skills in the art should understand that FIG. 4 not only can be used to describe the control circuit for the bridgeless PFC circuit but also can be used to describe the power source system including the bridgeless PFC circuit and the control circuit and the control method corresponding to the control circuit.

Taking a control method for the bridgeless PFC circuit as an example, in this control method, firstly the polarity of the input voltage is detected so as to output a first digital signal and a second digital signal indicating the polarity of the input voltage; subsequently an analog signal $V_{ZCD}$ is generated through the signal conversion processing according to at least one inductive signal reflecting the inductive voltage of the inductor, the first digital signal and the second digital signal; thereafter a predetermined pulse signal is provided and a driving pulse signal is generated according to the analog $V_{ZCD}$ and the predetermined pulse signal; and finally the driving pulse signal is distributed to the first switch Q1 and the second switch Q2 according to the first digital signal and the second digital signal, so that one of the first switch Q1 and the second switch Q2 performs the ON operation.

Figure 5:
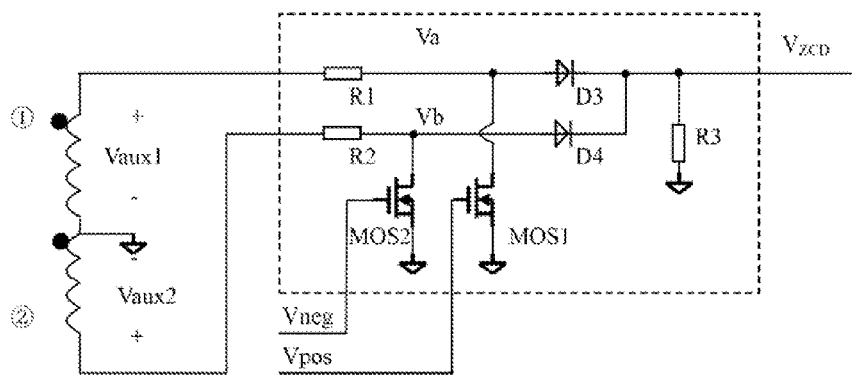
FIG. 5 illustrates a first embodiment of the signal conversion circuit in the control circuit in FIG. 4.
Figure 6:
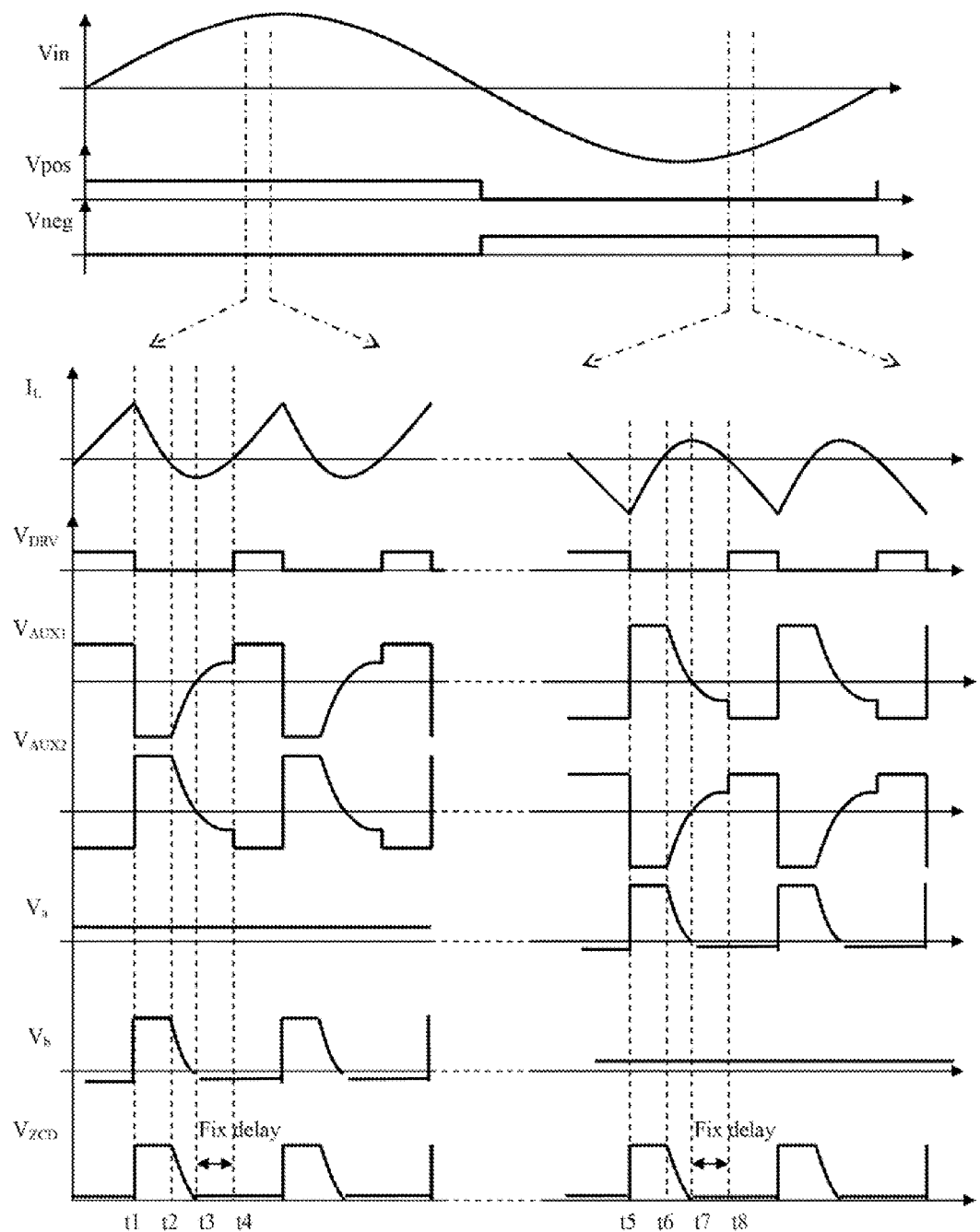
FIG. 6 illustrates a waveform schematic view of the current zero-crossing detection signal outputted by the signal conversion circuit in FIG. 5.

FIG. 5 illustrates a first embodiment of the signal conversion circuit in the control circuit in FIG. 4. FIG. 6 illustrates a waveform schematic view of the current zero-crossing detection signal outputted by the signal conversion circuit in FIG. 5.

Referring to FIG. 5, the control circuit includes a first auxiliary winding AUX1 and a second auxiliary winding AUX2 which are both coupled to the inductor L1. A polarity of a first inductive signal generated by the first auxiliary winding AUX1 is opposite to that of a second inductive signal generated by the second auxiliary winding AUX2.

In an embodiment, the signal conversion circuit includes a first analog switch and a second analog switch. The first analog switch is formed by a first resistor R1, a third diode D3 and a first switch MOS1. The second analog switch is formed by a second resistor R2, a fourth diode D4 and a second switch MOS2.

One end of the first resistor R1 is connected to the first end of the first auxiliary winding AUX1. The anode of the third diode D3 is connected to the other end of the first resistor R1. The cathode of the third diode D3 is connected to the output end of the signal conversion circuit so as to output the analog signal $V_{ZCD}$. The first end of the first switch MOS1 is connected to the other end of the first resistor R1 and the anode of the third diode D3. The second end of the first switch MOS1 is connected to the ground end. The control end of the first switch MOS1 is used to receive the second digital signal $V_{pos}$.

One end of the second resistor R2 is connected to the first end of the second auxiliary winding AUX2. The second ends of the second auxiliary winding AUX2 and the first auxiliary winding AUX1 are connected to the ground end respectively. The anode of the fourth diode D4 is connected to the other end of the second resistor R2. The cathode of the fourth diode D4 is connected to the output end of the signal conversion circuit so as to output the analog signal $V_{ZCD}$. The first end of the second switch. MOS2 is connected to the other end of the second resistor R2 and the anode of the fourth diode D4. The second end of the second switch MOS2 is connected to the ground end. The control end of the second switch MOS2 is used to receive the first digital signal $V_{neg}$.

It can be known from FIG. 6 that in an input voltage cycle, the waveform of the voltage $V_{AUX1}$ across two ends of the first auxiliary winding is always opposite to that of the voltage $V_{AUX2}$ across two ends of the second auxiliary winding. Furthermore, the waveform of the potential $V_a$ at the common node of the resistor R1 and the diode D3 in the first analog switch is just opposite to that of the potential $V_b$ at the common node of the resistor R2 and the diode D4 in the second analog switch in the first half cycle and the second half cycle of the input voltage. For example, in the first half cycle of the input voltage, the potential $V_a$ is a low potential and the potential $V_b$ varies along with the voltage waveform of the second auxiliary winding. Correspondingly, the waveform of the analog signal $V_{ZCD}$ outputted by the signal conversion circuit is the same as that of the potential $V_b$. Also for example, in the second half cycle of the input voltage, the potential $V_b$ is a low potential and the potential $V_a$ varies along with the voltage waveform of the first auxiliary winding. Correspondingly, the waveform of the analog signal $V_{ZCD}$ outputted by the signal conversion circuit is the same as that of the potential $V_a$.

Additionally, in the waveform of the analog signal $V_{ZCD}$, the period from t1 to t2 represents a stage that the inductor current decreases from the positive peak to zero. The period from t2 to t3 represents a stage that the inductor current varies from zero to the negative peak. The period from t3 to t4 represents a stage that the inductor current recovers from the negative peak to the zero current. Similarly, the period from t5 to t6 represents a stage that the inductor current varies from the negative peak to the zero current. The period from t6 to t7 represents a stage that the inductor current varies from zero to the positive peak. The period from t7 to t8 represents a stage that the inductor current decreases from the positive peak to zero.

Figure 7:
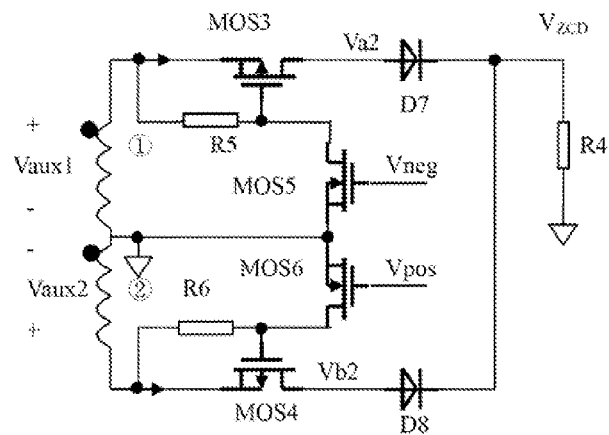
FIG. 7 illustrates a second embodiment of the signal conversion circuit in the control circuit in FIG. 4.
Figure 8:
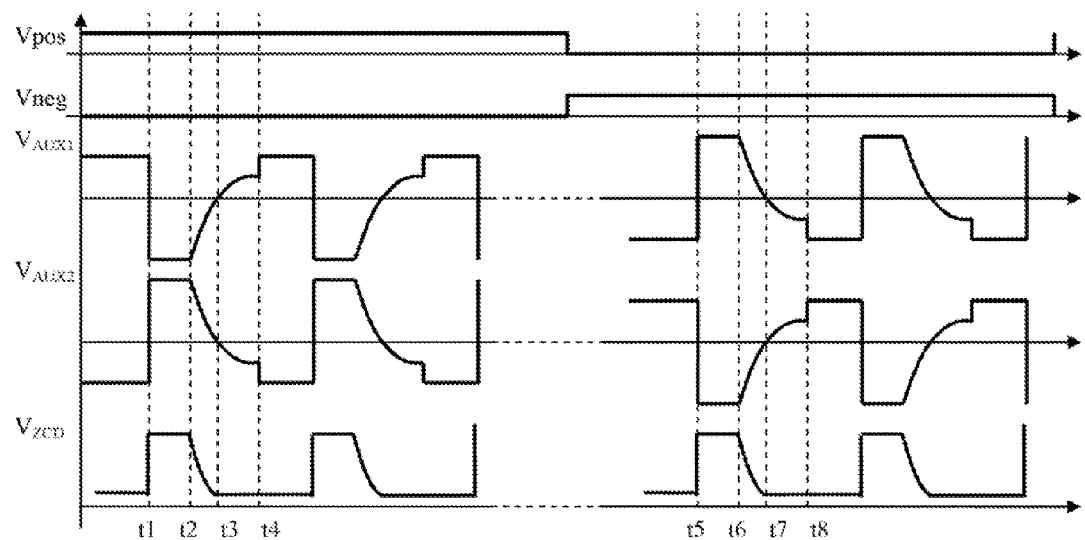
FIG. 8 illustrates a waveform schematic view of the current zero-crossing detection signal outputted by the signal conversion circuit in FIG. 7.

FIG. 7 illustrates a second embodiment of the signal conversion circuit in the control circuit in FIG. 4. FIG. 8 illustrates a waveform schematic view of the current zero-crossing detection signal outputted by the signal conversion circuit in FIG. 7.

Referring to FIG. 7, the control circuit includes a first auxiliary winding AUX1 and a second auxiliary winding AUX2 which are both coupled to the inductor L1. A polarity of a first inductive signal generated by the first auxiliary winding AUX1 is opposite to that of a second inductive signal generated by the second auxiliary winding AUX2.

In an embodiment, the signal conversion circuit includes a first analog switch and a second analog switch. The first analog switch is formed by a fifth resistor R5, a third switch MOS3 and a fifth switch MOS5. The second analog switch is formed by a sixth resistor RS, a fourth switch MOS4 and a sixth switch MOS6.

One end of the fifth resistor R5 is connected to the first end of the first auxiliary winding AUX1. The first end of the third switch MOS3 is connected to the first end of the first auxiliary winding AUX1. The second end of the third switch MOS3 is connected to the anode of a seventh diode D7. The control end of the third switch MOS3 is connected to the other end of the fifth resistor R5. The first end of the fifth switch MOS5 is connected to the other end of the fifth resistor R5 and the control end of the third switch MOS3. The second end of the fifth switch MOS5 is connected to the ground end. The control end of the fifth switch MOS5 is used to receive the first digital signal $V_{neg}$.

One end of the sixth resistor R6 is connected to the first end of the second auxiliary winding AUX2. The second ends of the second auxiliary winding AUX2 and the first auxiliary winding AUX1 are connected to the ground end respectively. The first end of the fourth switch MOS4 is connected to the first end of the second auxiliary winding AUX2. The second end of the fourth switch MOS4 is connected to the anode of an eighth diode D8. The control end of the fourth switch MOS4 is connected to the other end of the sixth resistor R6. The first end of the sixth switch MOS6 is connected to the other end of the sixth resistor R6 and the control end of the fourth switch MOS4. The second end of the sixth switch MOS6 is connected to the ground end. The control end of the sixth switch MOS6 is used to receive the second digital signal $V_{pos}$. The cathodes of the seventh diode D7 and the eighth diode D8 are connected to the output end of the signal conversion circuit respectively so as to output the analog signal $V_{ZCD}$.

The respective waveforms of the first auxiliary winding AUX1, the second auxiliary winding AUX2 and the analog signal $V_{ZCD}$ in FIG. 8 are the same as or similar to FIG. 6, and it is not illustrated any more for purpose of convenience.

Figure 9:
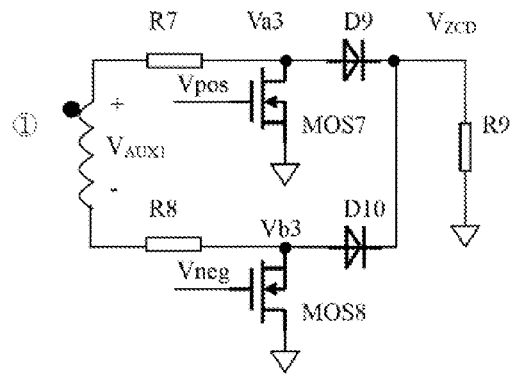
FIG. 9 illustrates a third embodiment of the signal conversion circuit in the control circuit in FIG. 4.
Figure 10:
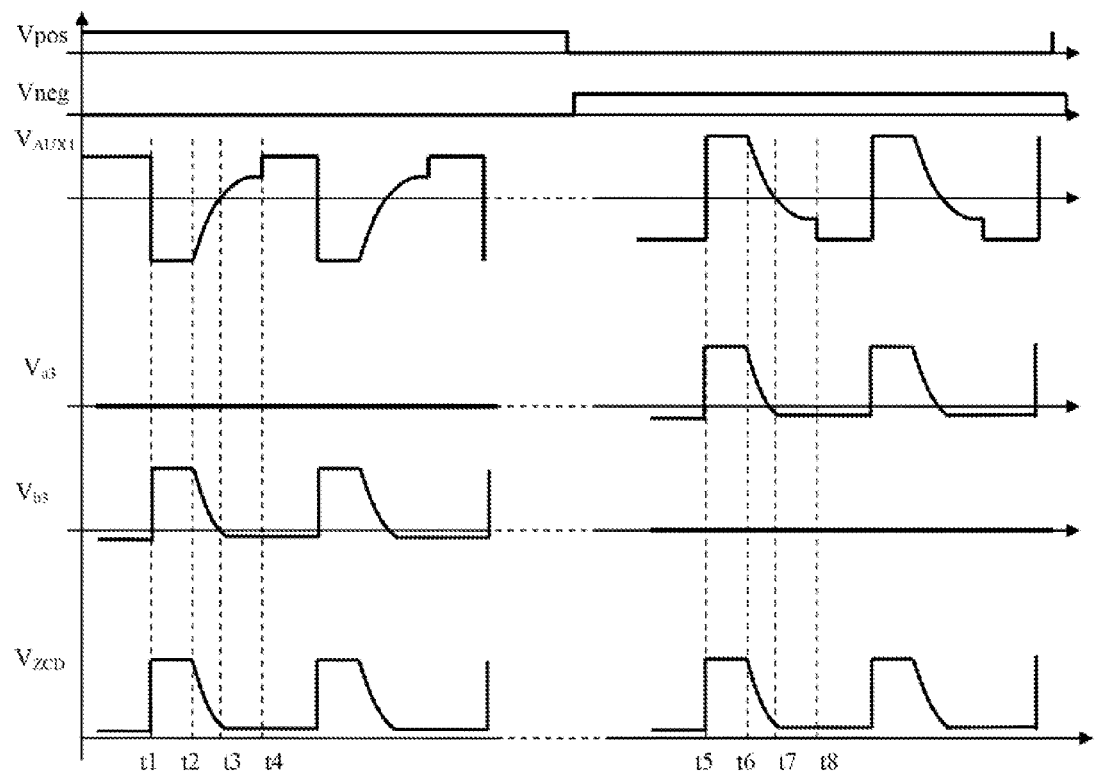
FIG. 10 illustrates a waveform schematic view of the current zero-crossing detection signal outputted by the signal conversion circuit in FIG. 9.

FIG. 9 illustrates a third embodiment of the signal conversion circuit in the control circuit in FIG. 4. FIG. 10 illustrates a waveform schematic view of the current zero-crossing detection signal outputted by the signal conversion circuit in FIG. 9.

Referring to FIG. 9, the control circuit includes the single auxiliary winding AUX1 coupled to the inductor L1. The analog signal $V_{ZCD}$ is generated by a third inductive signal generated by the auxiliary winding AUX1, the first digital signal and the second digital signal.

In an embodiment, the signal conversion circuit includes a first analog switch and a second analog switch. The first analog switch is formed by a seventh resistor R7, a ninth diode D9 and a seventh switch MOS7. The second analog switch is formed by an eighth resistor R8, a tenth diode D10 and an eighth switch MOS8.

One end of the seventh resistor R7 is connected to the first end of the auxiliary winding AUX1. The anode of the ninth diode D9 is connected to the other end of the seventh resistor R7. The cathode of the ninth diode D9 is connected to the output end of the signal conversion circuit so as to output the analog signal $V_{ZCD}$. The first end of the seventh switch MOS7 is connected to the other end of the seventh resistor R7 and the anode of the ninth diode D9. The second end of the seventh switch MOS7 is connected to the ground end. The control end of the seventh switch MOS7 is used to receive the second digital signal $V_{pos}$.

One end of the eighth resistor R8 is connected to the second end of the auxiliary winding AUX1. The anode of the tenth diode D10 is connected to the other end of the eighth resistor R8. The cathode of the tenth diode D10 is connected to the output end of the signal conversion circuit so as to output the analog signal $V_{ZCD}$. The first end of the eighth switch MOS8 is connected to the other end of the eighth resistor R8 and the anode of the tenth diode D10. The second end of the eighth switch MOS8 is connected to the ground end. The control end of the eighth switch MOS8 is used to receive the first digital signal $V_{neg}$.

Referring to FIGS. 9 and 10, in the first half cycle of the input voltage, the first digital signal $V_{neg}$ is at a low potential and the second digital signal $V_{pos}$ is at a high potential. At this time the seventh switch MOS7 is on and the eighth switch MOS8 is off. Therefore, the potential of $V_{a3}$ is maintained as the ground voltage, and at this time the potential of $V_{b3}$ varies along with the voltage waveform of the negative terminal of the auxiliary winding AUX1 (opposite to the variation trend of voltage waveform $V_{AUX1}$ of the auxiliary winding). Similarly, in the second half cycle of the input voltage, the first digital signal $V_{neg}$ is at a high potential and the second digital signal $V_{pos}$ is at a low potential. At this time the seventh switch MOS7 is of and the eighth witch MOS8 is on. Therefore, the potential of $V_{b3}$ is maintained as the ground voltage, and at this time the potential of $V_{a3}$ varies along with the voltage waveform of the positive terminal of the auxiliary winding AUX1 (the same as the variation trend of voltage waveform $V_{AUX1}$ of the auxiliary winding).

Figure 11:
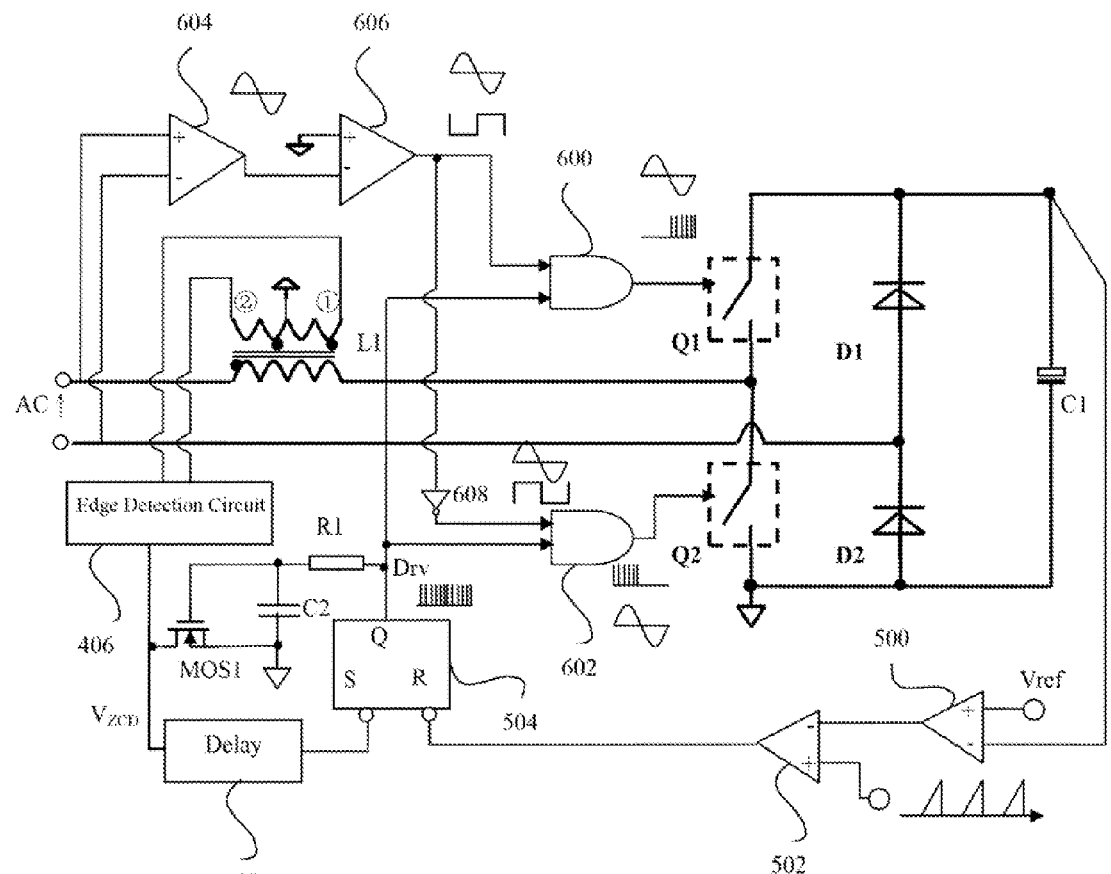
FIG. 11 illustrates a structure diagram of a control circuit for a PFC circuit according to another embodiment of the present invention.

FIG. 11 illustrates a structure diagram of a control circuit for a PFC circuit according to another embodiment of the present invention.

Referring to FIG. 11, the control circuit for the bridgeless PFC circuit includes a zero current detection circuit, a feedback circuit and a pulse distribution circuit.

The zero current detection circuit includes an edge detection circuit 406 and an enabling circuit. The edge detection circuit 406 receives at least one inductive signal reflecting the inductive voltage of the inductor L1 and detects and outputs the rising edge or the falling edge in the inductive signal. The enabling circuit filters the detected rising edge or the detected falling edge and outputs a zero current detection signal $V_{ZCD}$.

The feedback circuit is used to receive the zero current detection signal $V_{ZCD}$ and a predetermined pulse signal and generates a driving pulse signal according to the analog signal and the predetermined pulse signal. The pulse distribution circuit includes a polarity detection circuit. The polarity detection circuit receives the input voltage and outputs a first digital signal and a second digital signal indicating the polarity of the input voltage. The potential of the first digital signal is opposite to that of the second digital signal. The pulse distribution circuit distributes the received driving pulse signal to the first switch Q1 and the second switch Q2 of the first bridge arm according to the first digital signal and the second digital signal so that one of the first switch Q1 and the second switch Q2 performs the ON operation. After a switch cycle, one of the first switch Q1 and the second switch Q2 performs the ON operation for the next switch cycle when the current flowing through the inductor L1 decreases to a predetermined threshold value, and an ON time of the first switch Q1 is equal in each switch cycle and an ON time of the second switch Q2 is equal in each switch cycle.

Comparing FIG. 11 with FIG. 4, the main difference is that the polarity detection circuit in FIG. 11 does not detect the zero-crossing point of the inductor current waveform any longer and is instead used to distribute the driving pulse signal to the switch Q1 or the switch Q. That is, the first digital signal and the second digital signal outputted by the polarity detection circuit in FIG. 11, indicating the polarity of the input voltage, act on the driving pulse signal so as to control the ON operation of switch Q1 or the switch Q2. By comparison, the polarity detection circuit in FIG. 4 needs to send the first digital signal and the second digital signal into the signal conversion circuit so that the signal conversion circuit makes use of the first digital signal, the second digital signal and the inductive signal to output the analog signal $V_{ZCD}$, i.e., the analog signal for the zero current detection (ZCD).

In an embodiment, the polarity detection circuit includes a first operational amplifier 604, a first comparator 606 and a first inverter 608. The first operational amplifier 604, the first comparator 606 and the first inverter 608 have the same or similar connection manner with the first operational amplifier 100, the first comparator 102 and the first inverter 104 in FIG. 4, and thus it is not illustrated any more for purpose of convenience.

In another embodiment, the feedback circuit includes a second operational amplifier 500, a second comparator 502 and a RS trigger 504 The second operational amplifier 500, the second comparator 502 and the RS trigger 504 have the same or similar connection manner with the second operational amplifier 200, the second comparator 202 and the RS trigger 204 in FIG. 4, and thus it is not illustrated any more for purpose of convenience.

Additionally, the zero current detection circuit further includes a delay circuit 408 arranged between the enabling circuit and the RS trigger 504. The delay circuit 408 is used to delay the zero current detection signal $V_{ZCD}$ and send the delayed zero current detection signal to the preset end S of the RS trigger 504. As shown in FIG. 11, the enabling circuit is formed by the switch MOS1, the resistor R1 and the capacitor C2. The enabling circuit is used to select a correct edge signal and avoid generating a wrong current zero-crossing detection signal. Further details are described below with reference to FIGS. 12 and 13.

In an embodiment, the zero current detection circuit further includes a comparing unit (not shown) arranged between the delay circuit 408 and the RS trigger 504. The comparing unit is used to convert the delayed zero current detection signal into a corresponding digital delay signal and send it to the preset end S of the RS trigger 504.

In another embodiment, the pulse distribution circuit includes a first AND gate circuit 600 and a second AND gate circuit 602.

The first AND gate circuit 600 has a first input end, a second input end and an output end. The first input end of the first AND gate circuit 600 is used to receive the first digital signal from the polarity detection circuit. The second input end of the first AND gate circuit 600 is used to receive the driving pulse signal from the feedback circuit. The output end of the first AND gate circuit 600 outputs a first control signal to the first switch Q1 of the first bridge arm.

The second AND gate circuit 602 has a first input end, a second input end and an output end. The first input end of the second AND gate circuit 602 is used to receive the second digital signal from the polarity detection circuit. The second input end of the second AND gate circuit 602 is used to receive the driving pulse signal from the feedback circuit. The output end of the second AND gate circuit 602 outputs a second control signal to the second switch. Q2 of the first bridge arm. Since the driving pulse signal received by the second AND gate circuit 602 is the same as the driving pulse signal received by the first AND gate circuit 600 and the potential polarity of the second digital signal is always opposite to that of the first digital signal, only one of the first switch Q1 and the second switch Q2 in the first bridge arm is on and the other switch is off at any moment.

For example, when the polarity of the input voltage is positive, the first digital signal is at a low potential and the second digital signal is at a high potential. When the polarity of the input voltage is negative, the first digital signal is at a high potential and the second digital signal is at a low potential.

In an embodiment, the enabling circuit includes the switch MOS1, the resistor R1 and the capacitor C2. In particular, the first end of the switch MOS1 is electrically connected to the first end of the resistor R1. The second end of the switch MOS1 is connected to the output end of the edge detection circuit 406. The third end of the switch MOS1 is connected to the ground voltage. The first end of the resistor RI is electrically connected to the first end of the switch MOS1. The second end of the resistor R1 is electrically connected to the output end of the feedback circuit. One end of the capacitor C2 is connected to the first end of the switch MOS1 and the first end of the resistor R1. The other end of the capacitor C2 is connected to the third end of the switch MOS1. The enabling circuit filters the rising edge or the falling edge in the inductive signal outputted by the edge detection circuit 406 according to the driving pulse signal outputted by the feedback circuit so as to extract a correct edge signal.

Those of skills in the art should understand that FIG. 11 not only can be used to describe the control circuit for the bridgeless PFC circuit but also can be used to describe the power source system including the bridgeless PFC circuit and the control circuit and the control method corresponding to the control circuit.

Taking a control method for the bridgeless PFC circuit as an example, in this control method, firstly at least one inductive signal reflecting the inductive voltage of the inductor is received and a zero current detection signal generated through the edge detection and filtering processing; subsequently a predetermined pulse signal is provided and a driving pulse signal is generated according to the zero current detection signal and the predetermined pulse signal; thereafter the polarity of the input voltage is detected to output a first digital signal and a second digital signal indicating the polarity of the input voltage; and finally the driving pulse signal is distributed to the first switch Q1 and the second switch Q2 according to the first digital signal and the second digital signal, so that one of the first switch Q1 and the second switch Q2 performs the ON operation.

Figure 12:
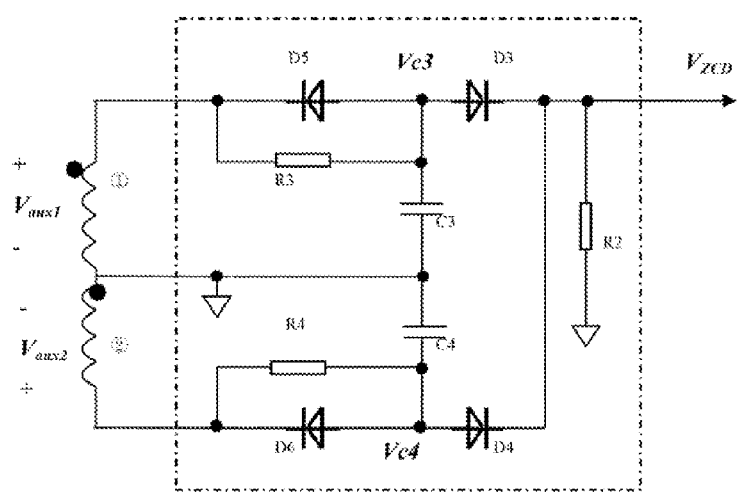
FIG. 12 illustrates a first embodiment of the edge detection circuit in the control circuit in FIG. 11.
Figure 13:
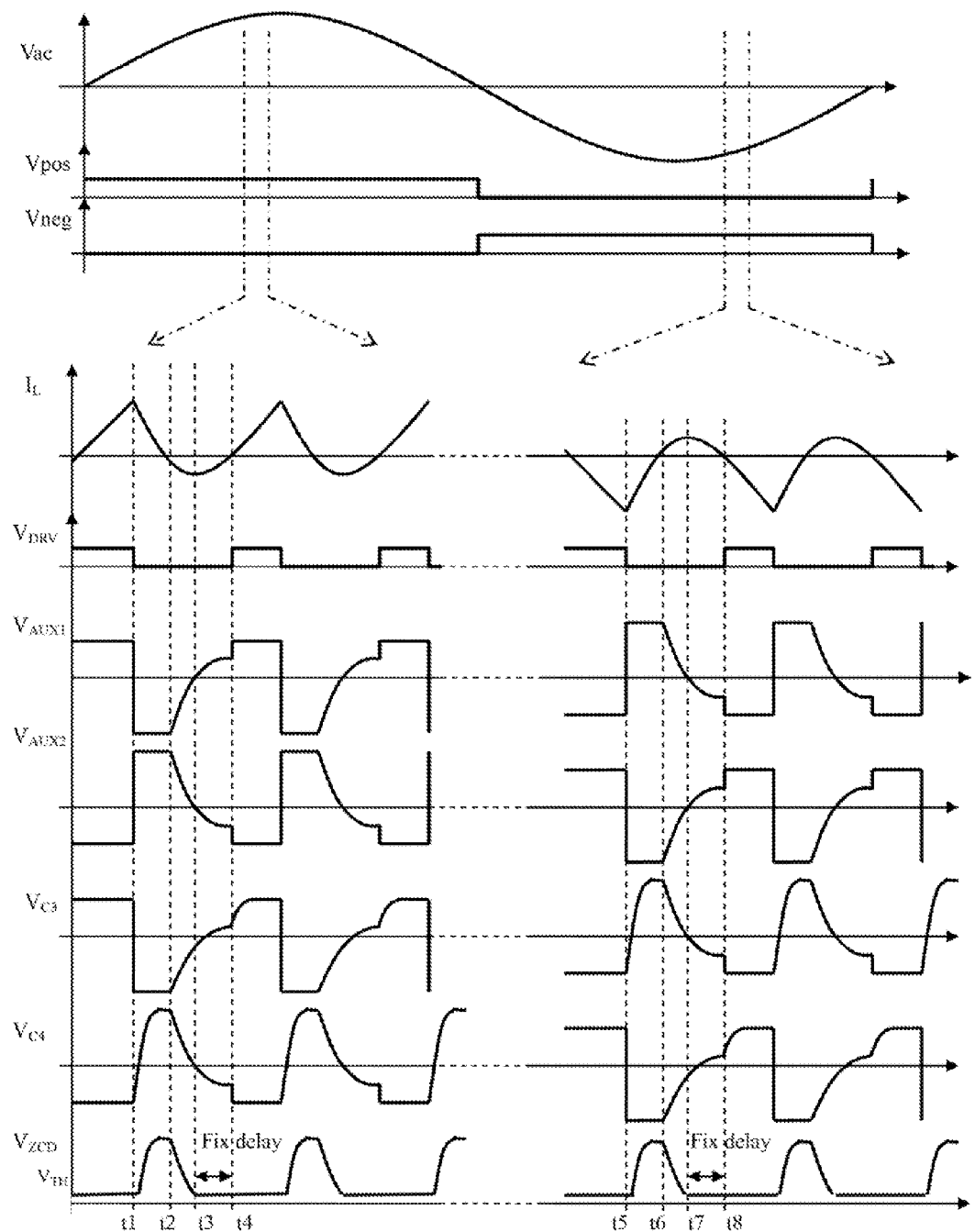
FIG. 13 illustrates a waveform schematic view of the current zero-crossing detection signal outputted by the edge detection circuit in FIG. 12.

FIG. 12 illustrates a first embodiment of the edge detection circuit in the control circuit in FIG. 11. FIG. 13 illustrates a waveform schematic view of the current zero-crossing detection signal outputted by the edge detection circuit in FIG. 12.

Referring to FIG. 12, the control circuit includes a first auxiliary winding AUX1 and a second auxiliary winding AUX2 which are both coupled to the inductor L1. The polarity of a first inductive signal generated by the first auxiliary winding AUX1 is opposite to that of a second inductive signal generated by the second auxiliary winding AUX2.

In an embodiment, the edge detection circuit includes a first analog switch and a second analog switch. The first analog switch is formed by a third resistor R3, a fifth diode D5 and a third capacitor C3. The second analog switch is formed by a fourth resistor R4, a sixth diode D6 and a fourth capacitor C4.

One end of the third resistor R3 is connected to the first end of the first auxiliary winding AUX1 The cathode of the fifth diode D5 is connected to the first end of the first auxiliary winding AUX1. The anode of the fifth diode D5 is connected to the other end of the third resistor R3. One end of the third capacitor C3 is connected to the anode of the fifth diode D5. The other end of the third capacitor C3 is connected to the ground end.

One end of the fourth resistor R4 is connected to the first end of the second auxiliary winding AUX2. The second ends of the second auxiliary winding AUX2 and the first auxiliary winding AUX1 are connected to the ground end respectively. The cathode of the sixth diode D6 is connected to the first end of the second auxiliary winding AUX2. The anode of the sixth diode D6 is connected to the other end of the fourth resistor R4. One end of the fourth capacitor C4 is connected to the anode of the sixth diode D6. The other end of the fourth capacitor C4 is connected to the ground end. The anode of the fifth diode D5 and the anode of the sixth diode D6 are connected to the third diode D3 and the fourth diode D4 respectively, so as to output the zero current detection signal $V_{ZCD}$ through the third diode D3 and the fourth diode D4.

Referring to FIGS. 12 and 13, at t1, the voltage $V_{c3}$ on the capacitor C3 is changed from a positive voltage signal to a negative voltage signal with one falling edge. If the above-mentioned enabling circuit is not provided, after the logic AND circuit formed by the diode D3 and the diode D4, $V_{ZCD}$ generates a corresponding falling edge waveform at the same time as t1. However, the falling edge is caused by the reversion of the voltage across two ends of the auxiliary winding due to the action of the switch, which is not a correct edge signal. Therefore, the driving signal $V_{DRV}$ of the switch is received by the enabling circuit. A certain delay is generated according to the resistor R1 and the capacitor C2 in order to drive the switch MOS1, so that $V_{ZCD}$ s a signal at a low potential during the period when $V_{DRV}$ is positive, such as $V_{TH}$ in FIG. 13. In this way, a wrong hopping signal is filtered through $V_{ZCD}$ and the enabling circuit and a correct zero current detection signal is obtained.

Figure 14:
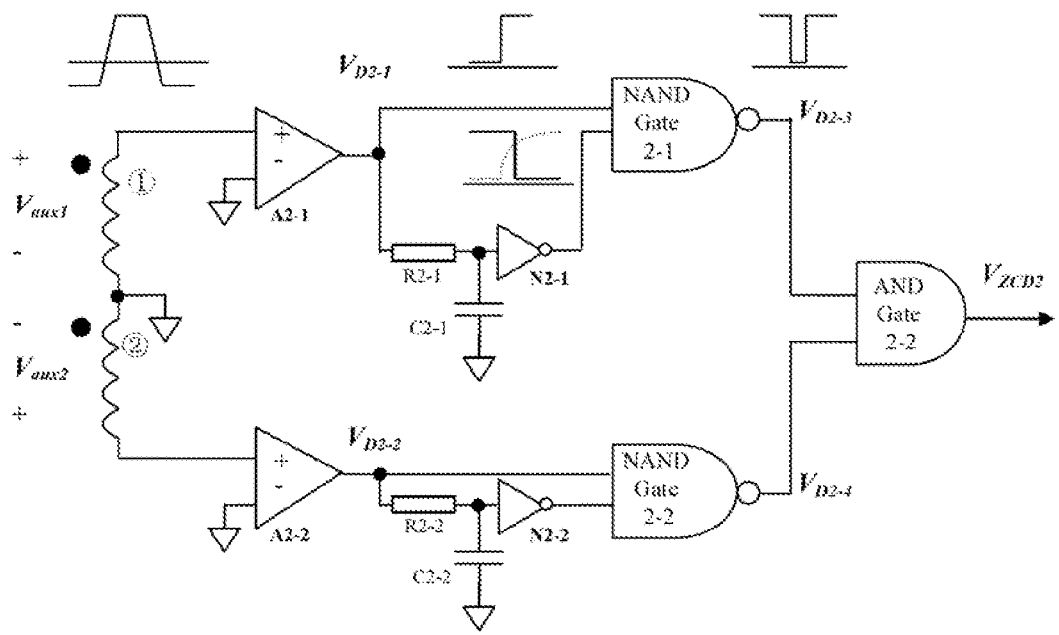
FIG. 14 illustrates a second embodiment of the edge detection circuit in the control circuit in FIG. 12.
Figure 15:
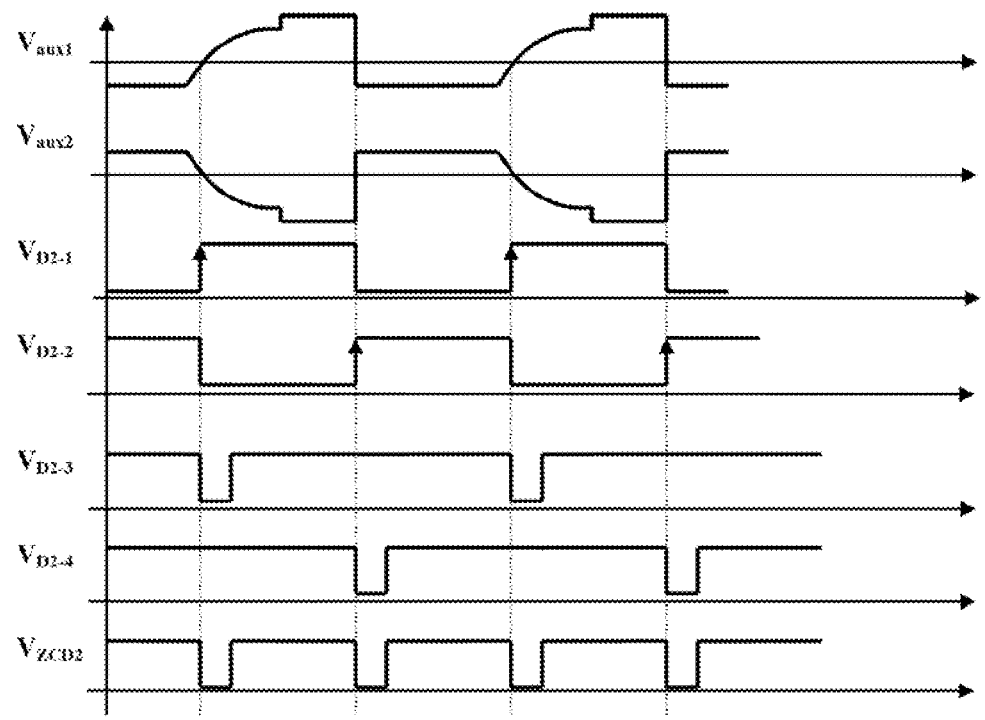
FIG. 15 illustrates a waveform schematic view of the current zero-crossing detection signal outputted by the edge detection circuit in FIG. 14.

FIG. 14 illustrates a second embodiment of the edge detection circuit in the control circuit in FIG. 12. FIG. 15 illustrates a waveform schematic view of the current zero-crossing detection signal outputted by the edge detection circuit in FIG. 14.

Referring to FIG. 14, the edge detection circuit includes a first detection module and a second detection module. The first detection module is formed by a first operational amplifier A2-1, a RC circuit, an inverter N2-1 and a NAND gate circuit 2-1. The second detection module is formed by a second operational amplifier A2-2, a RC circuit, an inverter N2-2 and a NAND gate circuit 2-2.

The first operational amplifier A2-1 has a first input end, a second input end and an output end. The first input end of the first operational amplifier A2-1 is connected to the first end of the first auxiliary winding AUX1. The second input end of the first operational amplifier A2-1 is connected to a ground voltage. The output end of the first operational amplifier A2-1 outputs a first digital signal $V_{D2-1}$. The RC circuit has a first resistor R2-1 and a first capacitor C2-1. One end of the first resistor R2-1 is connected to the output end of the first operational amplifier A2-1. One end of the first capacitor C2-1 is connected to the ground end. The input end of the inverter N2-1 is connected to the common node of the first resistor R2-1 and the first capacitor C2-1. The NAND gate circuit 2-1 has a first input end, a second input end and an output end. The first input end of the NAND gate circuit 2-1 is connected to the output end of the first operational amplifier A2-1. The second input end of the NAND gate circuit 2-1 is connected to the output end of the inverter N2-1. The output end of the NAND gate circuit 2-1 outputs a first pulse signal $V_{D2-3}$.

The second operational amplifier A2-2 has a first input end, a second input end and an output end. The first input end of the second operational amplifier A2-2 is connected to the first end of the second auxiliary winding AUX2. The second input end of the second operational amplifier A2-2 is connected to a ground voltage. The output end of the second operational amplifier A2-2 outputs a second digital signal $V_{D2-2}$. The RC circuit has a second resistor R2-2 and a second capacitor C2-2 One end of the second resistor R2-2 is connected to the output end of the second operational amplifier A2-2. One end of the second capacitor C2-2 is connected to the ground end. The input end of the inverter N2-2 is connected to the common node of the second resistor R2-2 and the second capacitor C2-2. The NAND gate circuit 2-2 has a first input end, a second input end and an output end. The first input end of the NAND gate circuit 2-2 is connected to the output end of the second operational amplifier A2-2. The second input end of the NAND gate circuit 2-2 is connected to the output end of the inverter N2-2. The output end of the NAND gate circuit 2-2 outputs a second pulse signal $V_{D2-4}$. The logic AND operation is performed for the first pulse signal $V_{D2-3}$ and the second pulse signal $V_{D2-4}$ to obtain the zero current detection signal.

Referring to FIG. 15, the first digital signal $V_{D2-1}$ outputted by the first operational amplifier A2-1 is used to detect the rising edge of the voltage waveform of the auxiliary winding AUX1. The second digital signal $V_{D2-2}$ outputted by the second operational amplifier A2-2 is used to detect the rising edge of the voltage waveform of the auxiliary winding AUX2. Therefore, the edge detection circuit is also referred to as the rising edge detection circuit. Additionally, the zero current detection signal $V_{ZCD2}$ is the voltage waveform obtained when the logic AND operation is performed for the first pulse signal $V_{D2-3}$ and the second pulse signal $V_{D2-4}$.

Figure 16:
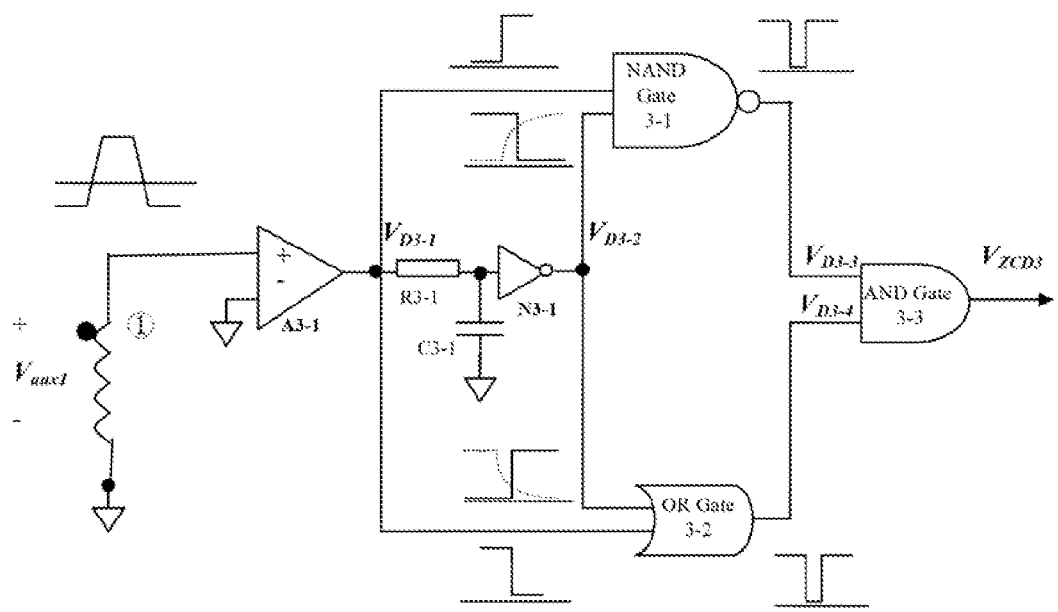
FIG. 16 illustrates a third embodiment of the edge detection circuit in the control circuit in FIG. 12.
Figure 17:
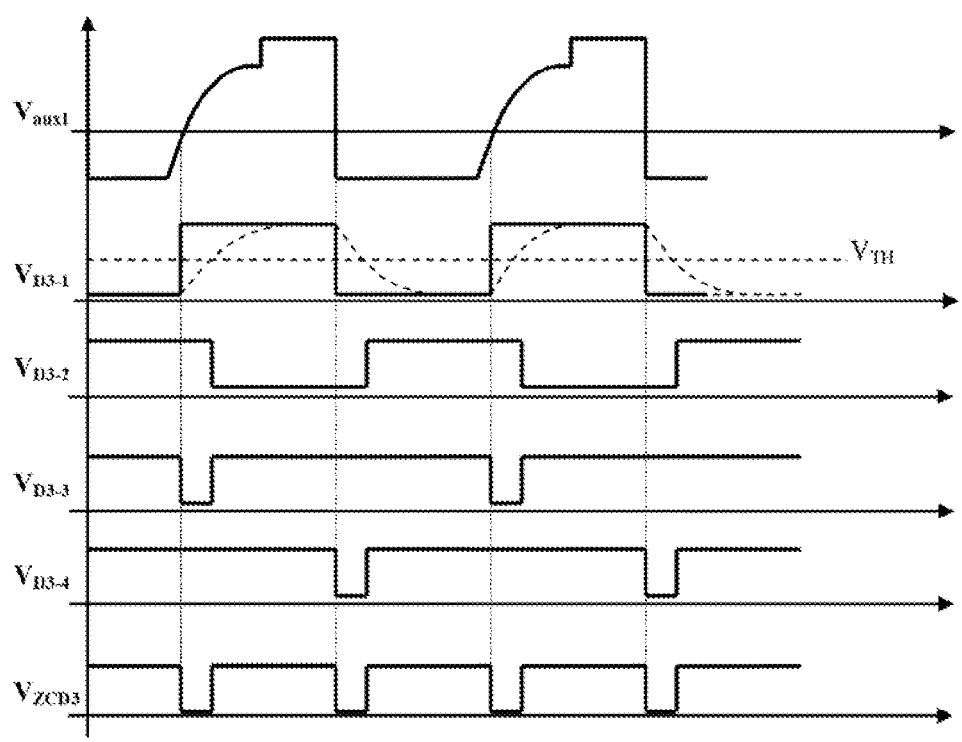
FIG. 17 illustrates a waveform schematic view of the current zero-crossing detection signal outputted by the edge detection circuit in FIG. 16.

FIG. 16 illustrates a third embodiment of the edge detection circuit in the control circuit in FIG. 12. FIG. 17 illustrates a waveform schematic view of the current zero-crossing detection signal outputted by the edge detection circuit in FIG. 16.

Referring to FIG. 16 the control circuit includes the single auxiliary winding AUX1 coupled to the inductor L1. A third inductive signal generated by the auxiliary winding AUX1 is used to detect and output the rising edge or the falling edge in the third inductive signal.

The edge detection circuit includes a detection module. The detection module has an operational amplifier A3-1, a RC circuit, an inverter N3-1, a NAND gate circuit 3-1 and an OR gate circuit 3-2.

The operational amplifier A3-1 has a first input end, a second input end and an output end. The first input end of the operational amplifier A3-1 is connected to the first end of the auxiliary winding AUX1. The second input end of the operational amplifier A3-1 is connected to a ground end. The output end of the operational amplifier A3-1 outputs a digital signal $V_{D3-1}$. The RC circuit has a resistor R3-1 and a capacitor C3-1. One end of the resistor R3-1 is connected to the output end of the operational amplifier A3-1. One end of the capacitor C3-1 is connected to the ground end. The input end of the inverter N3-1 is connected to the common node of the resistor R3-1 and the capacitor C3-1. The NAND gate circuit 3-1 has a first input end, a second input end and an output end. The first input end of the NAND gate circuit 3-1 is connected to the output end of the operational amplifier A3-1. The second input end of the NAND gate circuit 3-1 is connected to the output end of the inverter N3-1. The output end of the NAND gate circuit 3-1 outputs a first pulse signal $V_{D3-3}$. The OR gate circuit 3-2 has a first input end, a second input end and an output end. The first input end of the OR gate circuit 3-2 is connected to the output end of the operational amplifier A3-1. The second input end of the OR gate circuit 3-2 is connected to the output end of the inverter N3-1. The output end of the OR gate circuit 3-2 outputs a second pulse signal $V_{D3-4}$. The logic AND operation is performed for the first pulse signal $V_{D3-3}$ and the second pulse signal $V_{D3-4}$ to obtain the zero current detection signal $V_{ZCD3}$.

Referring to FIGS. 16 and 17, the rising edge detection circuit is formed by the resistor R3-1, the capacitor C3-1, the NOT gate N3-1 and the NAND gate 3-1, so as to convert the rising edge of the inductive voltage of the auxiliary winding AUX1 into the negative-logic narrow pulse $V_{D3-3}$. The falling edge detection circuit is formed by the resistor R3-1, the capacitor C3-1, the NOT gate N3-1 and the OR gate 3-2, so as to convert the falling edge of the inductive voltage of the auxiliary winding AUX1 into the negative-logic narrow pulse $V_{D3-4}$. The AND gate 3-3 combines the narrow pulses respectively formed by the rising edge detection circuit and the falling edge detection circuit so as to generate the zero current detection signal $V_{ZCD3}$. Therefore, in the embodiment, both the rising edge and the falling edge of the inductive voltage waveform of the auxiliary winding can be converted into the negative-logic narrow pulse so as to realize the functions of the rising edge detection and falling edge detection.

Figure 18:
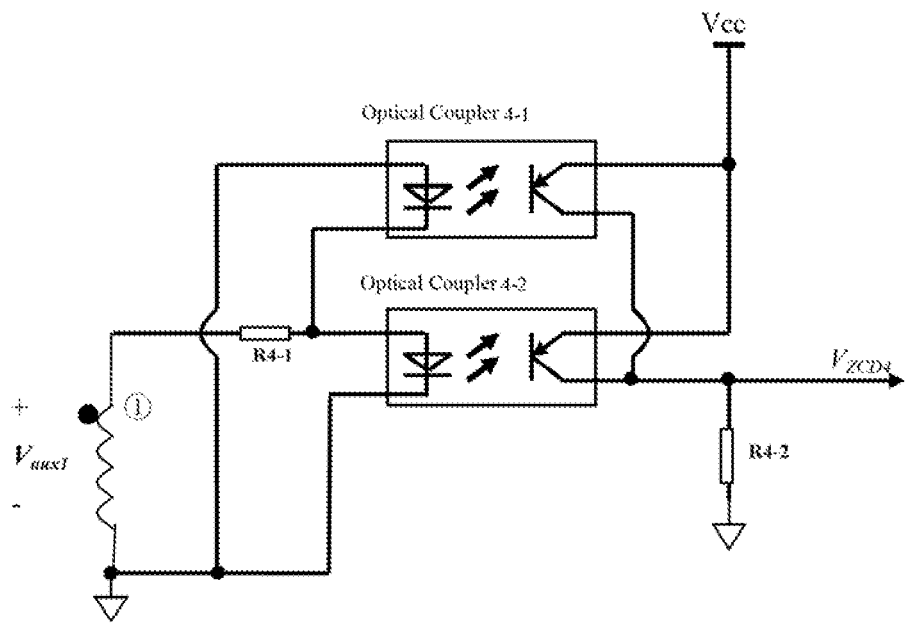
FIG. 18 illustrates a fourth embodiment of the edge detection circuit in the control circuit in FIG. 12.
Figure 19:
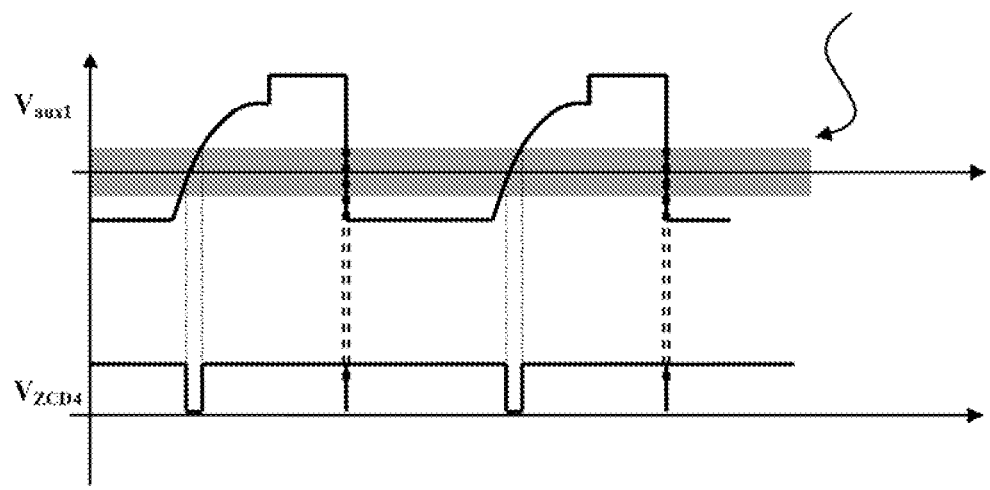
FIG. 19 illustrates a waveform schematic view of the current zero-crossing detection signal outputted by the edge detection circuit in FIG. 18.

FIG. 18 illustrates a fourth embodiment of the edge detection circuit in the control circuit in FIG. 12. FIG. 19 illustrates a waveform schematic view of the current zero-crossing detection signal outputted by the edge detection circuit in FIG. 18.

Referring to FIG. 18, the control circuit includes the single auxiliary winding AUX1 coupled to the inductor L1. An inductive signal generated by the auxiliary winding AUX1 is used to detect and output the rising edge or the falling edge in the inductive signal.

The edge detection circuit includes a first optical coupler 4-1 and a second optical coupler 4-2. The first input end of the first optical coupler 4-1 is connected to the second end of the auxiliary winding AUX1. The second input end of the first optical coupler 4-1 is connected to the first end of the auxiliary winding AUX1 through a first resistor R4-1. The first output end of the first optical coupler 4-1 is connected to a power source voltage $V_{CC}$. The first input end of the second optical coupler 4-2 is connected to the second input end of the first optical coupler 4-1. The second input end of the second optical coupler 4-2 is connected to the second end of the auxiliary winding AUX1. The first output end of the second optical coupler 4-2 is connected to the power source voltage $V_{CC}$. The second output end of the second optical coupler 4-2 is connected to the second output end of the first optical coupler 4-1 so as to output the zero current detection signal $V_{ZCD4}$.

Referring to FIGS. 18 and 19, when the inductive voltage of the auxiliary winding AUX1 has no hop, the inductive voltage can make one of the optical coupler 4-1 and the optical coupler 4-2 on so that the zero current detection signal $V_{ZCD4}$ is at a high potential. When the inductive voltage of the auxiliary winding is reversed (including conditions that the inductive voltage is modulated from the negative voltage to the positive voltage and from the positive voltage to the negative voltage), it is sure that the inductive voltage passes the common cutoff region of the optical coupler 4-1 and the optical coupler 4-2. At this time, the zero current detection signal $V_{ZCD4}$ is at a low potential so as to output a negative-logic narrow pulse. In this way, the edge detection function for the inductive voltage of the auxiliary winding also can be realized so that the zero-crossing point of the inductor current can be determined.

Although the present invention has been disclosed with reference to the above embodiments, these embodiments are not intended to limit the present invention. It will be apparent to those of skills in the art that various modifications and variations can he made without departing from the spirit and scope of the present invention. Therefore, the scope of the present invention shall be defined by the appended claims.

What is claimed is:

1. A control circuit for a PFC circuit, wherein the PFC circuit comprises an inductor, a first bridge arm and a second bridge arm connected to the first bridge arm in parallel, the first bridge arm has a first switch and a second switch connected with each other in series, and a common node of the first switch and the second switch is coupled to an input voltage through the inductor, the control circuit comprising:
   a zero current detection circuit, comprising:
      a polarity detection circuit, for receiving the input voltage and outputting a first digital signal and a second digital signal indicating a polarity of the input voltage, a potential of the first digital signal being opposite to that of the second digital signal; and
      a signal conversion circuit, for receiving at least one inductive signal reflecting an inductive voltage of the inductor, the first digital signal and the second digital signal and generating an analog signal;
   a feedback circuit, for receiving the analog signal and a predetermined pulse signal, and generating a driving pulse signal; and
   a pulse distribution circuit, for distributing the driving pulse signal to the first switch and the second switch of the first bridge arm according to the first digital signal and the second digital signal so that one of the first switch and the second switch performs an ON operation,
   wherein, after a switch cycle, one of the first switch and the second switch performs the ON operation for a next switch cycle when a current flowing through the inductor decreases to a predetermined threshold value, and an ON time of the first switch is equal in each switch cycle, and an ON time of the second switch is equal in each switch cycle.

2. The control circuit of claim 1, wherein, the polarity detection circuit comprises:
   a first operational amplifier, having a first input end, a second input end and an output end, the first input end and the second input end of the first operational amplifier being connected to two ends of the input voltage respectively, and the output end of the first operational amplifier being used to output a voltage signal reflecting the polarity of the input voltage;
   a first comparator, having a first input end, a second input end and an output end, the first input end of the first comparator being coupled to the output end of the first operational amplifier, the second input end of the first comparator being coupled to a first reference voltage, the output end of the first comparator being used to output the first digital signal; and
   a first inverter, for converting the first digital signal into the second digital signal.

3. The control circuit of claim 1, wherein, the control circuit comprises a first auxiliary winding and a second auxiliary winding both coupled to the inductor, and a polarity of a first inductive signal generated by the first auxiliary winding is opposite to that of a second inductive signal generated by the second auxiliary winding.

4. The control circuit of claim 3, wherein, the signal conversion circuit comprises:
   a first analog switch, having:
      a first resistor, one end of the first resistor being connected to a first end of the first auxiliary winding;
      a third diode, an anode of the third diode being connected to the other end of the first resistor, a cathode of the third diode being connected to an output end of the signal conversion circuit to output the analog signal; and
      a first switch, a first end of the first switch being connected to the other end of the first resistor and the anode of the third diode, a second end of the first switch being connected to a ground end, and the control end of the first switch being used to receive the second digital signal; and
   a second analog switch, having:
      a second resistor, one end of the second resistor being connected to a first end of the second auxiliary winding, the second ends of the second auxiliary winding and the first auxiliary winding being connected to a ground end respectively;
      a fourth diode, an anode of the fourth diode being connected to the other end of the second resistor, a cathode of the fourth diode being connected to the output end of the signal conversion circuit to output the analog signal; and
      a second switch, a first end of the second switch being connected to the other end of the second resistor and the anode of the fourth diode, a second end of the second switch being connected to a ground end, and a control end of the second switch being used to receive the first digital signal.

5. The control circuit of claim 3, wherein, the signal conversion circuit comprises:
   a first analog switch, having:
      a fifth resistor, one end of the fifth resistor being connected to the first end of the first auxiliary winding;
      a third switch, a first end of the third switch being connected to the first end of the first auxiliary winding, a second end of the third switch being connected to an anode of a seventh diode, and a control end of the third switch being connected to the other end of the fifth resistor; and
      a fifth switch, a first end of the fifth switch being connected to the other end of the fifth resistor and the control end of the third switch, a second end of the fifth switch being connected to a ground end, and a control end of the fifth switch being used to receive the first digital signal; and
   a second analog switch, having:
      a sixth resistor, one end of the sixth resistor being connected to the first end of the second auxiliary winding, the second ends of the second auxiliary winding and the first auxiliary winding being connected to a ground end respectively;
      a fourth switch, a first end of the fourth switch being connected to the first end of the second auxiliary winding, a second end of the fourth switch being connected to an anode of an eighth diode, and a control end of the fourth switch being connected to the other end of the sixth resistor; and
      a sixth switch, a first end of the sixth switch being connected to the other end of the sixth resistor and the control end of the fourth switch, a second end of the sixth switch being connected to a ground end, a control end of the sixth switch being used to receive the second digital signal, and the cathodes of the seventh diode and the eighth diode being connected to the output end of the signal conversion circuit respectively to output the analog signal.

6. The control circuit of claim 1, wherein, the control circuit comprises a third auxiliary winding coupled to the inductor, and the analog signal is generated through a third inductive signal generated by the third auxiliary winding, the first digital signal and the second digital signal.

7. The control circuit of claim 6, wherein, the signal conversion circuit comprises:
   a first analog switch, having:
      a seventh resistor, one end of the seventh resistor being connected to a first end of the third auxiliary winding;
      a ninth diode, an anode of the ninth diode being connected to the other end of the seventh resistor, a cathode of the ninth diode being connected to the output end of the signal conversion circuit to output the analog signal; and
      a seventh switch, a first end of the seventh switch being connected to the other end of the seventh resistor and the anode of the ninth diode, a second end of the seventh switch being connected to a ground end, and a control end of the seventh switch being used to receive the second digital signal; and
   a second analog switch, having:
      an eighth resistor, one end of the eighth resistor being connected to a second end of the third auxiliary winding;
      a tenth diode, an anode of the tenth diode being connected to the other end of the eighth resistor, a cathode of the tenth diode being connected to the output end of the signal conversion circuit to output the analog signal; and
      an eighth switch, a first end of the eighth switch being connected to the other end of the eighth resistor and the anode of the tenth diode, a second end of the eighth switch being connected to a ground end, and a control end of the eighth switch being used to receive the first digital signal.

8. The control circuit of claim 1, wherein, the feedback circuit comprises:
   a second operational amplifier, having a first input end, a second input end and an output end, the first input end of the second operational amplifier being used to receive an output voltage of the PFC circuit, the second input end of the second operational amplifier being coupled to a second reference voltage, and the output end of the second operational amplifier outputting a difference amplification signal;
   a second comparator, having a first input end, a second input end and an output end, the first input end of the second comparator being coupled to the output end of the second operational amplifier, the second input end of the second comparator being used to receive a saw-tooth wave voltage signal, the output end of the second comparator outputting the predetermined pulse signal; and
   a RS trigger, having a preset end, a reset end and an output end, the preset end of the RS trigger being used to receive the analog signal from the signal conversion circuit, the reset end of the RS trigger being used to receive the predetermined pulse signal from the second comparator, and the output end of the RS trigger being used to output the driving pulse signal.

9. The control circuit of claim 8, wherein, the feedback circuit further comprises a delay circuit arranged between the signal conversion circuit and the RS trigger, and the delay circuit is used to delay the analog signal and send the delayed analog signal to the preset end of the RS trigger.

10. The control circuit of claim 9, wherein, the feedback circuit further comprises a comparing unit arranged between the delay circuit and the RS trigger, and the comparing unit is used to convert the delayed analog signal into a corresponding digital delay signal and send it to the preset end of the RS trigger.

11. The control circuit of claim 1, wherein, the pulse distribution circuit comprises:
   a first AND gate circuit, having a first input end, a second input end and an output end, the first input end of the first AND gate circuit being used to receive the first digital signal, the second input end of the first AND gate circuit being used to receive the driving pulse signal, and the output end of the first AND gate circuit outputting a first control signal to the first switch of the first bridge arm; and
   a second AND gate circuit, having a first input end, a second input end and an output end, the first input end of the second AND gate circuit being used to receive the second digital signal, the second input end of the second AND gate circuit being used to receive the driving pulse signal, and the output end of the second AND gate circuit outputting a second control signal to the second switch of the first bridge arm.

12. The control circuit of claim 11, wherein, when the polarity of the input voltage is positive, the first digital signal is at a low potential and the second digital signal is at a high potential; and when the polarity of the input voltage is negative, the first digital signal is at a high potential and the second digital signal is at a low potential.

13. A power source system, comprising:
   a PFC circuit, comprising:
      a first bridge arm, comprising a first switch and a second switch connected with each other in series, a common node of the first switch and the second switch being coupled to one end of an input voltage through an inductor; and
      a second bridge arm, comprising a third switch and a fourth switch connected with each other in series, a common node of the third switch and the fourth switch being coupled to the other end of the input voltage; and
   a control circuit, comprising
      a zero current detection circuit, having a polarity detection circuit and a signal conversion circuit, wherein, the polarity detection circuit is used to receive the input voltage and output a first digital signal and a second digital signal indicating a polarity of the input voltage, a potential of the first digital signal is opposite to that of the second digital signal, and the signal conversion circuit is used to receive at least one inductive signal reflecting an inductive voltage of the inductor, the first digital signal and the second digital signal, and generate an analog signal;
      a feedback circuit, for receiving the analog signal and a predetermined pulse signal, and generating a driving pulse signal; and
      a pulse distribution circuit, for distributing the driving pulse signal to the first switch and the second switch of the first bridge arm according to the first digital signal and the second digital signal so that one of the first switch and the second switch performs an ON operation,
      wherein, after a switch cycle, one of the first switch and the second switch performs the ON operation for a next switch cycle when a current flowing through the inductor decreases to a predetermined threshold value, and an ON time of the first switch is equal in each switch cycle, and an ON time of the second switch is equal in each switch cycle.

14. The power source system of claim 13, wherein, the control circuit comprises a first auxiliary winding and a second auxiliary winding both coupled to the inductor, and a polarity of a first inductive signal generated by the first auxiliary winding is opposite to that of a second inductive signal generated by the second auxiliary winding.

15. The power source system of claim 13, wherein, the control circuit comprises a third auxiliary winding coupled to the inductor, and the analog signal is generated by a third inductive signal generated by the third auxiliary winding, the first digital signal and the second digital signal.

16. The power source system of claim 13, wherein, each of the first switch and the second switch in the first bridge arm is a fast-recovery MOSFET and each of the third switch and the fourth switch in the second bridge arm is a slow-recovery MOSFET.

17. The power source system of claim 16, wherein, each of the first switch and the second switch is a wide band gap semiconductor component.

18. The power source system of claim 17, wherein, the wide band gap semiconductor component is silicon carbide or gallium nitride.

19. A control method for a PFC circuit, wherein the PFC circuit comprises an inductor, a first bridge arm and a second bridge arm connected to the first bridge arm in parallel, the first bridge arm having a first switch and a second switch connected with each other in series, a common node of the first switch and the second switch being coupled to an input voltage through the inductor, and the control method comprises:
   detecting a polarity of the input voltage to output a first digital signal and a second digital signal indicating the polarity of the input voltage;
   generating an analog signal through a signal conversion processing according to at least one inductive signal reflecting an inductive voltage of the inductor, the first digital signal and the second digital signal;
   providing a predetermined pulse signal and generating a driving pulse signal according to the analog signal and the predetermined pulse signal; and
   distributing the driving pulse signal to the first switch and the second switch according to the first digital signal and the second digital signal so that one of the first switch and the second switch performs an ON operation.

20. The control method of claim 19, wherein, after a switch cycle, one of the first switch and the second switch performs the ON operation for the next switch cycle when a current flowing through the inductor decreases to a predetermined threshold value, and an ON time of the first switch is equal in each switch cycle, and an ON time of the second switch is equal in each switch cycle.

21. The control method of claim 19, wherein, the step of detecting a polarity of the input voltage further comprises:
   performing a difference amplification for the input voltage to obtain a voltage signal reflecting the polarity of the input voltage;

comparing the voltage signal with a first reference voltage to obtain and output the first digital signal; and reversing the first digital signal to obtain and output the second digital signal.

22. The control method of claim 19, wherein, the step of providing a predetermined pulse signal and generating a driving pulse signal further comprises:

performing an amplification of difference between an output voltage of the PFC circuit and a second reference voltage to output a difference amplification signal;

comparing the difference amplification signal with a sawtooth wave voltage signal to output the predetermined pulse signal; and inputting the analog signal and the predetermined pulse signal into a preset end and a reset end of a RS trigger respectively and outputting the driving pulse signal through the RS trigger.

23. The control method of claim 22, wherein, the step of providing a predetermined pulse signal and generating a driving pulse signal further comprises:

performing a delay processing for the analog signal and sending the delayed analog signal to the preset end of the RS trigger.

24. The control method of claim 19, wherein, the step of distributing the driving pulse signal to the first switch and the second switch further comprises:

performing a logic AND operation for the first digital signal and the driving pulse signal and sending a processed first control signal to a control end of the first switch; and performing the logic AND operation for the second digital signal and the driving pulse signal and sending a processed second control signal to a control end of the second switch, wherein, one of the first switch and the second switch is enabled to perform the ON operation correspondingly by one of the first control signal and the second control signal.

* * * * *